United States Patent
Crafts et al.

(10) Patent No.: US 12,354,467 B2
(45) Date of Patent: *Jul. 8, 2025

(54) WIRELESS COMMUNICATION DIAGNOSTICS

(71) Applicant: Lutron Technology Company LLC, Coopersburg, PA (US)

(72) Inventors: Jordan H. Crafts, Bethlehem, PA (US); Kyle Thomas Barco, Bethlehem, PA (US); Bryan Robert Barnes, Lansdale, PA (US); David J. Dolan, Coopersburg, PA (US); William Bryce Fricke, Bethlehem, PA (US); Joel Hnatow, Allentown, PA (US); Jonathan T. Lenz, Waltham, MA (US)

(73) Assignee: Lutron Technology Company LLC, Coopersburg, PA (US)

( * ) Notice: Subject to any disclaimer, the term of this patent is extended or adjusted under 35 U.S.C. 154(b) by 233 days.

This patent is subject to a terminal disclaimer.

(21) Appl. No.: 18/321,023

(22) Filed: May 22, 2023

(65) Prior Publication Data
US 2023/0326331 A1    Oct. 12, 2023

Related U.S. Application Data

(60) Continuation of application No. 17/188,781, filed on Mar. 1, 2021, now Pat. No. 11,694,541, which is a
(Continued)

(51) Int. Cl.
*H04W 88/08*    (2009.01)
*G08C 17/02*    (2006.01)
*H05B 47/19*    (2020.01)

(52) U.S. Cl.
CPC ............ *G08C 17/02* (2013.01); *H04W 88/08* (2013.01); *H05B 47/19* (2020.01); *G08C 2201/34* (2013.01); *G08C 2201/70* (2013.01)

(58) Field of Classification Search
CPC .... G08C 17/02; G08C 23/02; G08C 2201/34; G08C 2201/70; H04W 88/08;
(Continued)

(56) References Cited

U.S. PATENT DOCUMENTS

| 4,864,588 A | 9/1989 | Simpson et al. |
| 5,005,211 A | 4/1991 | Yuhasz |

(Continued)

FOREIGN PATENT DOCUMENTS

| CN | 101641938 A | 2/2010 |
| CN | 102318443 A | 1/2012 |

(Continued)

OTHER PUBLICATIONS

Lynn, Samara, "Wireless Witch: How to Place a Wireless Extender", Available at http://in.gcrnaq.com/networking/68806/feature/wireless-witch-tlow-to-glace-a-wireless-extender, Nov. 12, 2013, 11 pages.
(Continued)

*Primary Examiner* — Adnan Aziz
(74) *Attorney, Agent, or Firm* — Michael S. Czarnecki; Glen R. Farbanish; Philip N. Smith

(57) ABSTRACT

A load control system may include devices for performing communications for controlling an amount of power provided to an electrical load. The devices may include load control devices that may communicate by transmitting digital messages. A user device having an adjustable wireless communication range may be used for discovering devices, configuring devices, and/or diagnosing devices in the load control system. The user device may detect whether devices are within an established wireless communication range of one another for performing communications. The user device may detect digital messages transmitted from a device and/or digital messages received at a device to determine whether the digital messages are correctly com-
(Continued)

municated in the load control system. The user device may provide an indication to a user indicating whether a digital message is correctly transmitted or received by a device in the load control system.

30 Claims, 24 Drawing Sheets

Related U.S. Application Data continuation of application No. 16/253,621, filed on Jan. 22, 2019, now Pat. No. 10,937,307, which is a division of application No. 14/578,156, filed on Dec. 19, 2014, now Pat. No. 10,339,795.

(60) Provisional application No. 61/920,504, filed on Dec. 24, 2013.

(58) Field of Classification Search
CPC ... H05B 47/19; H05B 47/196; H04L 12/2809; H04L 12/2803; H04L 12/2807
See application file for complete search history.

(56) References Cited

U.S. PATENT DOCUMENTS

| | | | |
|---|---|---|---|
| 5,146,153 A | 9/1992 | Luchaco et al. |
| 5,216,692 A | 6/1993 | Ling |
| 5,237,264 A | 8/1993 | Moseley et al. |
| 5,239,205 A | 8/1993 | Hoffman et al. |
| 5,382,947 A | 1/1995 | Thaler et al. |
| 5,565,855 A | 10/1996 | Knibbe |
| 5,905,442 A | 5/1999 | Mosebrook et al. |
| 6,057,756 A | 5/2000 | Engellenner et al. |
| 6,174,073 B1 | 1/2001 | Regan et al. |
| 6,567,403 B1 | 5/2003 | Congdon et al. |
| 6,791,467 B1 | 9/2004 | Ben-Ze-'ev |
| 6,803,728 B2 | 10/2004 | Balasubramaniam et al. |
| 6,859,644 B2 | 2/2005 | Wang |
| 6,927,547 B2 | 8/2005 | Walko, Jr. et al. |
| 6,980,080 B2 | 12/2005 | Christensen et al. |
| 6,983,783 B2 | 1/2006 | Carmen, Jr. et al. |
| 7,002,461 B2 | 2/2006 | Duncan et al. |
| 7,027,736 B1 | 4/2006 | Mier-Langer et al. |
| 7,126,291 B2 | 10/2006 | Kruse et al. |
| 7,277,930 B2 | 10/2007 | Hillis et al. |
| 7,348,736 B2 | 3/2008 | Piepgras et al. |
| 7,363,028 B2 | 4/2008 | de Clerq et al. |
| 7,391,297 B2 | 6/2008 | Cash et al. |
| 7,397,342 B2 | 7/2008 | Mullet et al. |
| 7,498,952 B2 | 3/2009 | Newman, Jr. |
| 7,504,940 B2 | 3/2009 | Luebke et al. |
| 7,640,007 B2 | 12/2009 | Chen et al. |
| 7,755,505 B2 | 7/2010 | Johnson et al. |
| 7,764,162 B2 | 7/2010 | Cash et al. |
| 7,839,017 B2 | 11/2010 | Huizenga et al. |
| 7,880,639 B2 | 2/2011 | Courtney et al. |
| 7,889,051 B1 | 2/2011 | Billig et al. |
| 7,940,167 B2 | 5/2011 | Steiner et al. |
| 8,009,042 B2 | 8/2011 | Steiner et al. |
| 8,093,993 B2 | 1/2012 | Chou et al. |
| 8,199,010 B2 | 6/2012 | Sloan et al. |
| 8,228,163 B2 | 7/2012 | Cash et al. |
| 8,228,184 B2 | 7/2012 | Blakeley et al. |
| 8,260,471 B2 | 9/2012 | Storch et al. |
| 8,306,051 B2 | 11/2012 | Stocker |
| 8,417,388 B2 | 4/2013 | Altonen et al. |
| 8,429,435 B1 | 4/2013 | Clayton et al. |
| 8,581,707 B2 | 11/2013 | Bucci |
| 8,598,978 B2 | 12/2013 | Knode et al. |
| 8,605,625 B2 | 12/2013 | Laroia et al. |
| 8,823,268 B2 | 9/2014 | Saveri, III et al. |
| 8,893,968 B2 | 11/2014 | Jonsson |
| 9,148,937 B2 | 9/2015 | Steiner et al. |
| 9,155,172 B2 | 10/2015 | Baragona et al. |
| 9,374,874 B1 | 6/2016 | Ewing |
| 9,491,772 B2 | 11/2016 | Bruhn et al. |
| 9,553,451 B2 | 1/2017 | Zacharchuk et al. |
| 2002/0042282 A1 | 4/2002 | Haupt |
| 2002/0154025 A1 | 10/2002 | Ling |
| 2003/0010297 A1 | 6/2003 | Creel et al. |
| 2004/0020144 A1 | 10/2004 | Wang |
| 2005/0024228 A1 | 2/2005 | Vignon et al. |
| 2005/0032540 A1 | 2/2005 | Lee et al. |
| 2005/0130687 A1 | 6/2005 | Filipovic et al. |
| 2005/0014568 A1 | 7/2005 | Milenkovic et al. |
| 2005/0151626 A1 | 7/2005 | Shin |
| 2005/0159823 A1* | 7/2005 | Hayes ............... H04L 12/2803 700/19 |
| 2005/0245215 A1 | 11/2005 | Abhishek et al. |
| 2006/0004415 A1 | 3/2006 | Wang |
| 2006/0109203 A1 | 5/2006 | Huber et al. |
| 2007/0178927 A1 | 8/2007 | Fernandez-Corbaton et al. |
| 2008/0092075 A1 | 4/2008 | Jacob et al. |
| 2008/0029732 A1 | 12/2008 | Barkan et al. |
| 2009/0012184 A1 | 5/2009 | Bauchot et al. |
| 2009/0206983 A1 | 8/2009 | Knode et al. |
| 2009/0273433 A1 | 11/2009 | Rigatti et al. |
| 2009/0295545 A1 | 12/2009 | O'Haire et al. |
| 2010/0036512 A1 | 2/2010 | Rutjes et al. |
| 2010/0185339 A1 | 7/2010 | Huizenga et al. |
| 2010/0207548 A1 | 8/2010 | Iott |
| 2010/0244746 A1 | 9/2010 | Van De Sluis et al. |
| 2010/0273421 A1 | 10/2010 | Tu et al. |
| 2011/0140832 A1 | 6/2011 | Vinkenvleugel et al. |
| 2011/0140864 A1 | 6/2011 | Bucci |
| 2011/0016960 A1 | 7/2011 | Brandsma et al. |
| 2011/0251807 A1 | 10/2011 | Rada et al. |
| 2012/0047269 A1 | 2/2012 | Leonov et al. |
| 2012/0056712 A1 | 3/2012 | Knode |
| 2012/0014074 A1 | 6/2012 | Carruthers |
| 2012/0196536 A1* | 8/2012 | Koo ............... H04L 67/125 455/41.2 |
| 2012/0286672 A1 | 11/2012 | Holland et al. |
| 2013/0030589 A1 | 1/2013 | Pessina et al. |
| 2013/0107042 A1 | 5/2013 | Forster |
| 2014/0052783 A1 | 2/2014 | Swatsky et al. |
| 2014/0117871 A1 | 5/2014 | Swatsky et al. |
| 2014/0026676 A1 | 9/2014 | Neeley et al. |
| 2014/0265568 A1 | 9/2014 | Crafts et al. |
| 2014/0277805 A1 | 9/2014 | Browne, Jr. et al. |
| 2014/0336821 A1* | 11/2014 | Blaine ............... G05B 19/0423 700/275 |
| 2015/0015377 A1 | 1/2015 | Bull et al. |
| 2015/0348403 A1* | 12/2015 | Berelejis ............... G08C 23/02 367/197 |
| 2016/0019212 A1 | 6/2016 | Leland et al. |
| 2017/0123390 A1* | 5/2017 | Barco ............... H05B 47/199 |

FOREIGN PATENT DOCUMENTS

| | | |
|---|---|---|
| EP | 1447946 A2 | 8/2004 |
| WO | 2003007665 A1 | 1/2003 |
| WO | WO2008123858 A1 | 10/2008 |

OTHER PUBLICATIONS

Lutron, "Energi Save Node Handheld Programming Guide", Lutron Electronics Inc., Coopersburg, PA, 2012, 96 pages.

* cited by examiner

Discovered Digital Messages:

| | 504 | 506 | 508 | |
|---|---|---|---|---|
| Control-Source Device ID | Control-Target Device ID | Message ID | Trans. Range | Message |
| 1234 | 5678 | 9101 | 0111 | 0101 |

502 → table → 510, 500

FIG. 5A

| Source Device ID | Target Device ID | Message ID | Trans. Range | Message |
|---|---|---|---|---|
| 5678 | 1234 | 9102 | 0011 | 0110 |

522 → table → 530, 520

FIG. 5B

| Source Device ID | Target Device ID | Message ID | Sequence Num. | Message |
|---|---|---|---|---|
| 5678 | 7891 | 9103 | 1 | 1010 |

542 → table → 550, 540

FIG. 5C

| Source Device ID | Target Device ID | Message ID | Message |
|---|---|---|---|
| 1234 | 5678 | 9104 | 0101 |

562 → table → 568, 560

FIG. 5D

| Source Device Type | Device ID | Event Num. | Message ID | Received Message |
|---|---|---|---|---|
| Occ. Sensor | 1234 | 1 | 2345 | Vacancy Detected |
| Remote | 5678 | 1 | 6789 | Up Button Press |
| Remote | 5678 | 2 | 6790 | Down Button Press |
| Light Sensor | 9101 | 1 | 1213 | Light Threshold |
| Occ. Sensor | 1234 | 3 | 2347 | Vacancy Detected |
| Occ. Sensor | 1234 | 4 | 2348 | Occupancy Detected |

FIG. 12

WIRELESS COMMUNICATION DIAGNOSTICS

CROSS-REFERENCE TO RELATED APPLICATIONS

This application is a continuation of U.S. patent application Ser. No. 17/188,781, filed Mar. 1, 2021; which is a continuation of U.S. patent application Ser. No. 16/253,621, filed Jan. 22, 2019, now U.S. Pat. No. 10,937,307 issued Mar. 2, 2021; which is a divisional of U.S. patent application Ser. No. 14/578,156, filed Dec. 19, 2014, now U.S. Pat. No. 10,339,795, issued Feb. 7, 2019; all of which claim priority to U.S. Provisional Application No. 61/920,504, filed Dec. 24, 2013, entitled WIRELESS COMMUNICATION DIAGNOSTICS, the entire disclosure of which is hereby incorporated by reference.

BACKGROUND

A user environment, such as a residence or an office building for example, may be configured with various types of load control systems. A lighting control system may be used to control the lighting loads in the user environment. A motorized window treatment control system may be used to control the natural light provided to the user environment. A heating, ventilation, and air-conditioning (HVAC) system may be used to control the temperature in the user environment.

Each load control system may include various control devices, including control-source devices and control-target devices. The control-target devices may receive digital messages from one or more of the control-source devices. The digital messages may include load control messages for controlling an electrical load. The control-target devices may be capable of directly controlling the electrical load. The control-source devices may be capable of indirectly controlling the electrical load via the control-target device. Examples of control-target devices may include lighting control devices (e.g., a dimmer switch, an electronic switch, a ballast, or a light-emitting diode (LED) driver), a motorized window treatment, a temperature control device (e.g., a thermostat), a plug-in load control device, and/or the like. Examples of control-source devices may include remote control devices, occupancy sensors, daylight sensors, temperature sensors, shadow sensors, and/or the like. To enable a control-target device to recognize instructions received from a control-source device, the control-target device and the control-source device may be associated with one another, such that the control-target device may recognize the digital messages received from the control-source device.

FIG. 1A depicts a prior art user environment in which control-source devices and control-target devices may be installed. As shown in FIG. 1, a user environment may include load control environments, e.g., rooms 102, 104, and 106. Each of the rooms 102, 104, and 106 may include control-target devices that may be capable of directly controlling an electrical load. For example, rooms 102, 104, and 106 may include lighting control devices 112, 130, and 136. The lighting control devices 112, 130, and 136 may be ballasts, LED drivers, dimmer switches, and/or the like. Lighting control devices 112, 130, and 136 may be capable of directly controlling an amount of power provided to lighting loads 114, 132, and 138, respectively. Room 102 may include additional control-target devices, such as a motorized window treatment 116 for directly controlling the covering material 118 (e.g., via an electrical motor), a plug-in load control device 126 for directly controlling a floor lamp 128, a desk lamp, or other electrical load that may be plugged into the plug-in load control device 126, and a temperature control device 124 (e.g., thermostat) for directly controlling an HVAC system.

Rooms 102, 104, and 106 may include control-source devices capable of indirectly controlling an electrical load by transmitting digital messages, such as load control messages, to a control-target device. The control-source devices in rooms 102, 104, and 106 may include remote control devices 122, 134, and 140 that may send digital messages to the lighting control devices 112, 130, and 136, respectively. The lighting control devices 112, 130, and 136 may control an amount of power provided to the lighting loads 114, 132, and 138, respectively, based on the digital messages received from the remote control devices 122, 134, and 140. Room 102 may include additional control-source devices, such as an occupancy sensor 110, a daylight sensor 108, and a shadow sensor 120. The occupancy sensor 110 may send digital messages to a control-target device based on an occupancy or vacancy condition (e.g., movement or lack of movement) that is sensed within its observable area. The daylight sensor 108 may send digital messages to a control-target device based on the detection of an amount of light within its observable area. The shadow sensor 120 may send digital messages to a control-target device based on a measured level of light received from outside of the room 102. For example, the shadow sensor 120 may detect when direct sunlight is directly shining into the shadow sensor 120, is reflected onto the shadow sensor 120, or is blocked by external means, such as clouds or a building, and may send a message indicating the measured light level.

When a user 142 attempts to use any of the control devices in the load control system shown in FIG. 1A, the control devices may operate improperly or inefficiently. The improper or inefficient operation of the control devices may be due to an improper system configuration. The load control system may be configured such that the control devices are not optimally located within the load control system to properly receive digital messages from other control devices. Additionally, communications between control devices may be improperly received, or even lost, due to interference within the load control system. As shown in FIG. 1A, multiple control devices may be communicating digital messages within the same wireless space. Interference within the wireless space may result in lost digital messages and a lower level of performance within the load control system.

Current system configuration devices fail to provide a convenient way to gather information for proper system configuration. FIG. 1B depicts a prior art system for gathering information and configuring the control devices in a load control system based on the information gathered. As shown in FIG. 1B, a user 144 may determine that a control device within the wireless communication system is operating improperly or inefficiently. The user 144 may be a contractor or other person experienced in configuring control devices within the load control system. The user 144 may use a wireless communication sniffing module 148 to read wireless communications within the load control system. The wireless communication sniffing module 148 may provide wireless communication information to the user 144 via a laptop 146.

As shown in FIG. 1B, the wireless communication sniffing module 142 may be able to read communications within the wireless range 148. The wireless communication sniffing module 142 may, however, miss some digital messages due to its proximity to some control devices. As some control devices, such as the occupancy sensor 110, the lighting control device 112, the lighting control device 130, remote control 134, and/or remote control 140, may transmit and/or receive digital messages outside of the wireless range 148, the lighting control device 130 may be unable to read these messages.

Additionally, for the digital messages that can be read by the wireless communication sniffing module, the information that is read may be provided in a format that may be unable to be understood by the user 144. FIG. 2 is a diagram that illustrates an example of a graphical user interface (GUI) 202 that may be provided to the user 144 on the laptop 146 to indicate the digital messages 204 that may be read by the wireless communication sniffing module 142. The messages 204 may include an identifier of a source device from which the digital message was sent, an identifier of a target device to which the digital message was sent, a message identifier, and/or the like. As shown in FIG. 2, the GUI 202 may provide the digital messages 204 in a constant stream of bits that may be difficult or unable to be understood by the user 144. As such, the user 144 may have to take the information gathered by the wireless communication sniffing module 148 to another destination to have the digital messages parsed to properly troubleshoot the problems with the wireless communications. The user 144 may then re-visit the load control environment shown in FIG. 1B to configure control devices therein.

SUMMARY

A load control system may include control devices, such as control-source devices and control-target devices, for controlling an amount of power provided to an electrical load. A control-target device may be capable of controlling the amount of power provided to the electrical load based on digital messages received from a control-source device. The digital messages may include load control instructions or another indication that causes the control-target device to determine load control instructions for controlling the electrical load.

The load control system may include a user device for providing information to a user for configuring the control devices in the load control system. The user device may detect whether control devices are within an established wireless communication range of one another. The user device may discover the control-target devices and/or control-source devices. The established wireless communication range may be adjusted to detect different devices. Once detected, the user device may send an identification message to the device that may cause the device to identify itself. The established wireless communication range may be adjusted to correspond to a transmit power of a control device to detect the devices within the wireless transmission range of the control device.

The user device may discover the control devices by broadcasting a discovery message within the established range and receiving a response to the discovery message from the control devices within the established wireless communication range. The discovery message may include an indication of a device type that may respond to the discovery message. The wireless communication range in which the discovery message may be sent may be established based on a transmit power of the user device. The established range may be adjusted as the transmit power of the user device is adjusted. The established range may be determined by disregarding any information received from a device outside of the established range.

The user device may detect whether a digital message is transmitted from a control device in the load control system. The user device may detect a digital message that may be sent from the control device through the established wireless communication range. The user device may parse the information in the digital message. The user device may identify the control device to and/or from which the digital message may be sent. The control device may be identified by comparing a device identifier within the digital message with a device identifier stored within the user device. The device identifier may be obtained by the user device from one or more devices in the load control system. The information within the digital message may be provided to the user in a manner that may allow the user to determine whether one or more control devices may be reconfigured to improve the wireless communications within the load control system.

The user device may detect whether a digital message is received at a control device in the load control system. The user device may send a discovery message to a control device within the established wireless communication range. The discovery message may include an indication of a device type that may respond to the discovery message and/or an indication of the type of information being requested by the user device. The discovery message may request the type of devices from which the control device may receive digital message and/or a timeframe in which the digital messages may have been received. The control device may respond to the discovery message by providing information about the communications received from other control devices within the wireless communication system.

Communications between the user device and the devices within the load control system may be performed via a wireless communication module. The wireless communication module may be capable of communicating with the user device via a communication channel and with the load control devices via another communication channel. The established wireless range of the user device may correspond to the transmit power of the wireless communication module. The wireless communication module may adjust a transmit power to discover the control devices and/or digital messages within the established range.

BRIEF DESCRIPTION OF THE DRAWINGS

Figure 2:
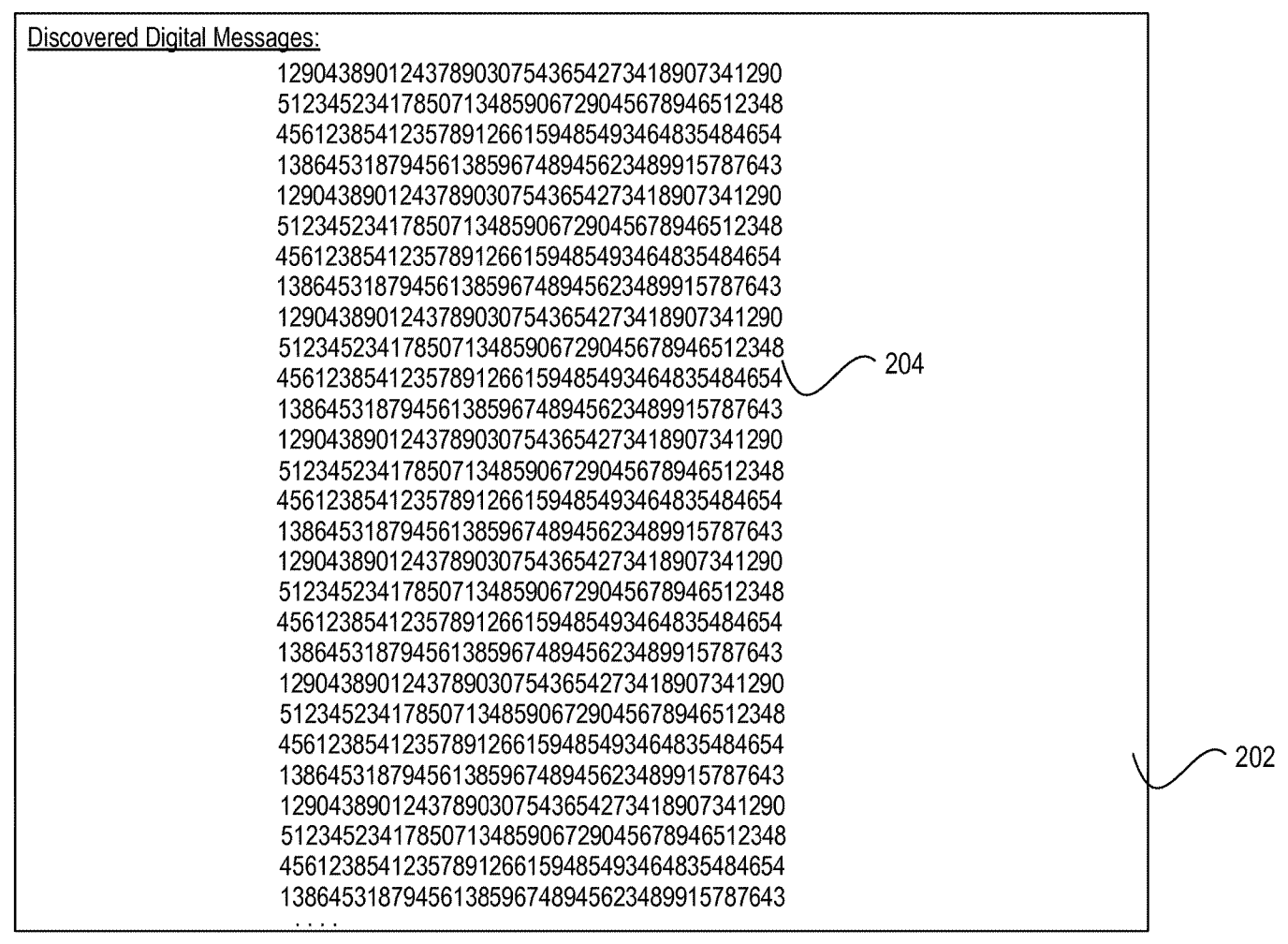

FIG. 2 depicts an example of a prior art graphical user interface (GUI) that may be provided to a user to display digital messages read by a wireless communication sniffing module.

FIGS. 5A-5D depict example messages that may be transmitted and/or received in a load control environment.

FIG. 12 illustrates example information that may be maintained at a receiving device in a load control system.

DETAILED DESCRIPTION

Figure 1A:
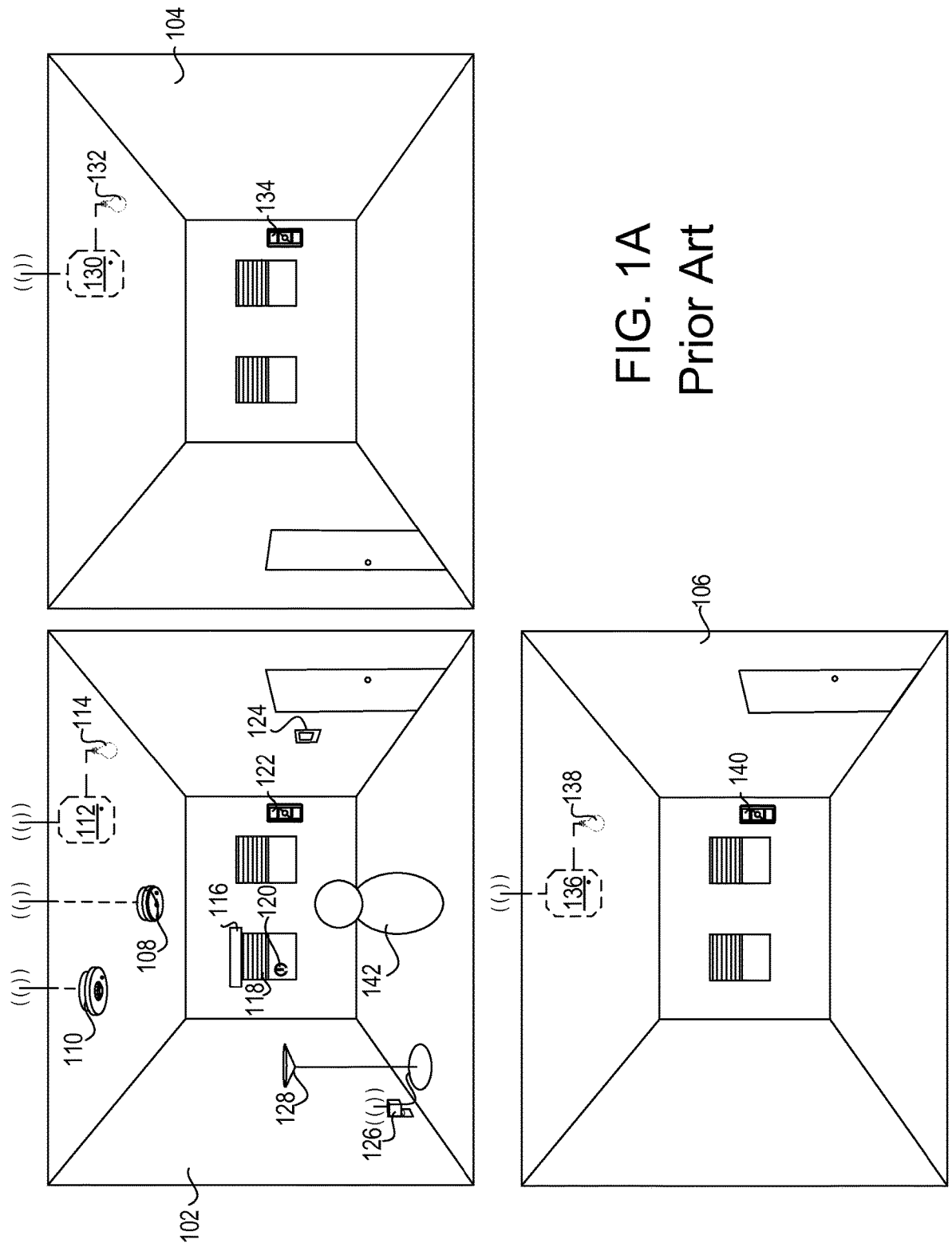
FIG. 1A depicts an example prior art load control environment.
Figure 1B:
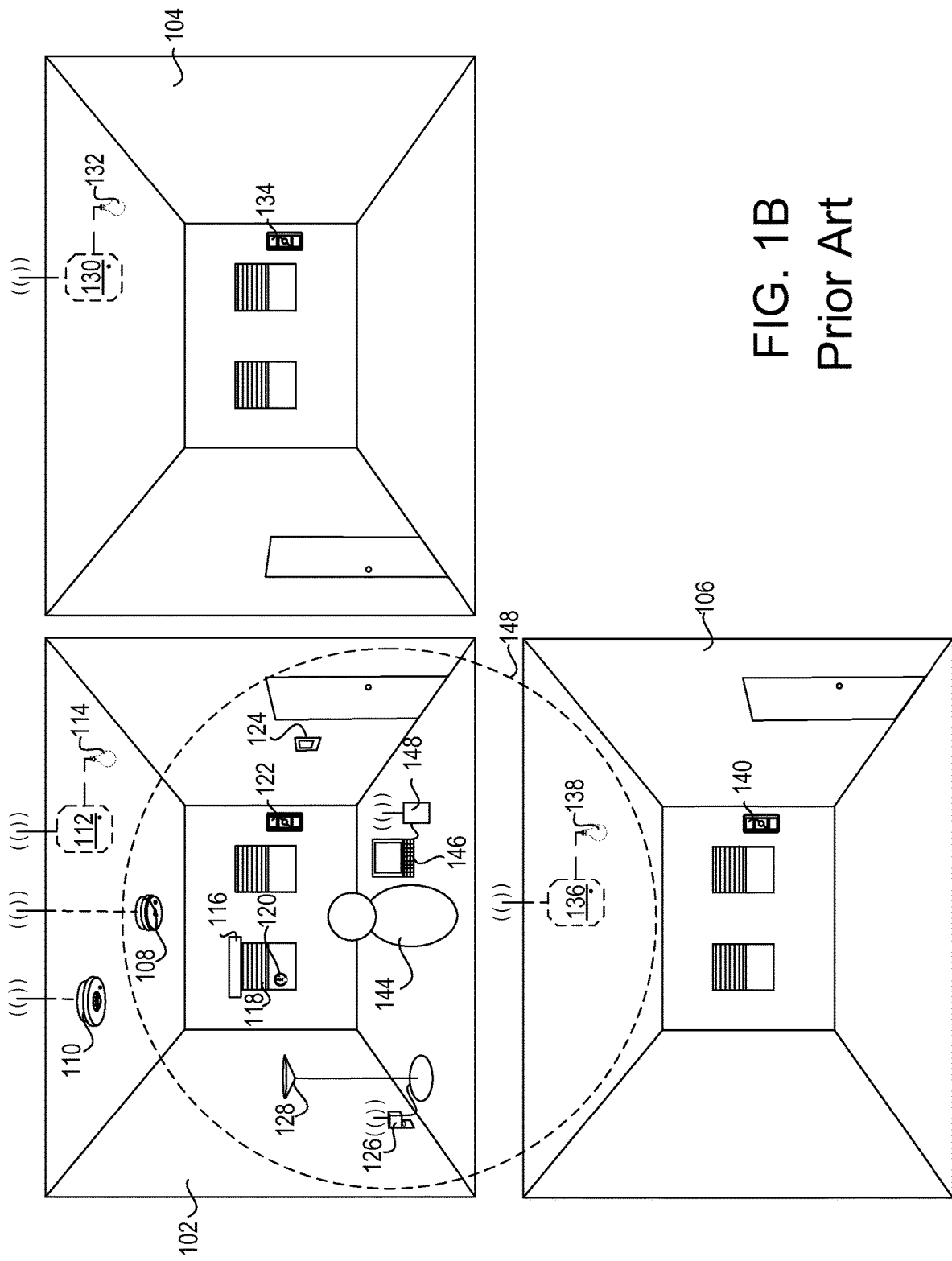
FIG. 1B depicts an example prior art load control environment that includes a prior art system for gathering information from control devices in the load control environment.
Figure 3A:
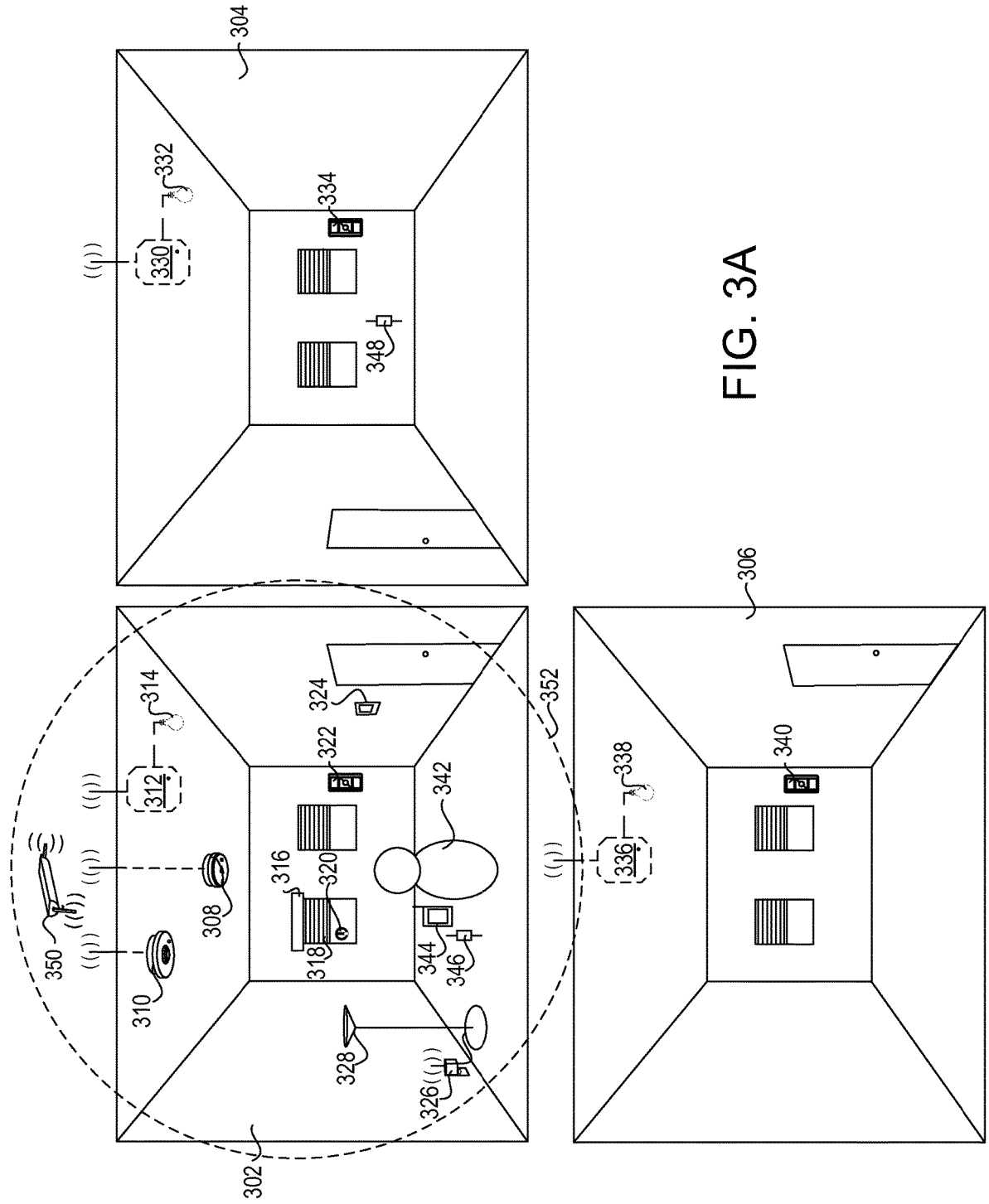
FIGS. 3A, 3B, and 3C are example load control environments in which information may be gathered from devices in the load control environments.

FIG. 3A depicts a representative environment for gathering information from control devices in a load control system. The information may be gathered for detecting problems in and/or configuring the load control system. The load control environment may include control-source devices and control-target devices. When a control-target device is associated with a control-source device, the control-target device may be responsive to the control-source device. A device may be both a control-target and a control-source device. As shown in FIG. 3A, rooms 302, 304, and 306 may be installed with one or more control-target devices. The control-target devices may be used for controlling (e.g., directly controlling) the electrical loads within a room or building. Each control-target device may be controlled by a control-source device. Example control-target devices may include lighting control devices 312, 330, and 336 (e.g., ballasts, LED drivers, dimmer switches, etc.) for controlling the amount of power provided to lighting loads 314, 332, and 338, respectively, a motorized window treatment 316 having a motor drive unit (e.g., including a motor) for controlling the position of a covering material 318, a temperature control device 324 (e.g., a thermostat) for controlling an HVAC system, and/or a plug-in load control device 326 for controlling a plug-in electrical load, such as a floor lamp 328, a table lamp or another electrical device that is plugged in to the plug-in load control device 326.

A control-source device may indirectly control the amount of power provided to an electrical load by transmitting digital messages to the control-target device. The digital messages may include control instructions, such as load control instructions, or another indication that causes the control-target device to determine load control instructions for controlling an electrical load. Example control-source devices may include a user device 344 (e.g., a mobile device), remote control devices 322, 334, and 340, an occupancy sensor 310, and/or a daylight sensor 308. The user device 344 may include a wired or wireless device. Examples of the user device 344 may include a wireless phone, a tablet, a laptop, a personal digital assistant (PDA), or the like. The control-source devices may also include load control devices, such as a dimmer switch, an electronic switch, or the like. The remote control devices 322, 334, and 340 may be wireless devices capable of controlling a control-target device via wireless communications. The remote control devices 322, 334, and 340 may be attached to the wall (e.g., wall-mounted switch or wall-mounted dimmer) or detached from the wall.

The user device 344 may communicate with other devices via one or more communication modules, such as communication module 346. The communication module 346 may be included in the user device 344, may be included in a load control device, or may be external to the user device 344 and the load control devices, as shown in FIG. 3A. The user device 344 may perform wired or wireless communications with communication module 346. The communication module 346 may communicate with load control devices via wireless communications. Example wireless communication channels, protocols, and/or technologies may use WI-FI® communication channels and/or protocols, ZIGBEE communication channels and/or protocols, BLUETOOTH® communication channels and/or protocols, a proprietary communication protocol (such as the CLEAR CONNECT™ protocol), near field communication (NFC) channels and/or protocols, or the like. The communication module 346 may communicate with the user device 344 and one or more load control devices via different communications channels. For example, the communication module 346 may perform communications with the user device 344 via BLUETOOTH® a communication channel and may communicate with one or more load control devices via a WI-FI® communication channel or a communication channel having a proprietary communication protocol, such as CLEAR CONNECT™ protocol.

The user device 344 may establish a wireless range 352 in which it may transmit digital messages to and/or receive digital messages from other devices. The digital messages transmitted from the user device 344 may be discovery messages that may be used to discover devices within the established range 352. The discovery message may be used to determine the distance of devices that respond to the discovery message. The discovery message may be broadcast within the established range 352, or may be directed to an individual device or group of devices within the established range 352.

The discovery message may be used to determine the transmission power of a two-way communication device within the established range 352. The discovery message may be received by two-way communication devices that may respond to the discovery message by sending a response message. The two-way communication devices may include control-source devices, such as the daylight sensor 308, the occupancy sensor 310, the shadow sensor 320, and/or the remote control device 322. The two-way communication devices may include control-target devices, such as the lighting control device 312, the motorized window treatment 316, the temperature control device 324, and/or the plug-in load control device 326.

The user device 344 may transmit the discovery message and receive a response to the discovery message from control devices capable of performing two-way communications within the established range 352. The response message my include information identifying the control device from which the response message is transmitted. The response message may indicate the type of device responding (e.g., device-type identifier), an identifier (e.g., serial number) that may indicate the individual device, the link address for communicating with the device directly, the communication type (e.g., whether the device is a control-target device, a control-source device, or both), the wireless transmission range of the device, and/or other information about the control device. Upon receipt of the response message, the user device 344 may determine that the control device from which the response message is received is within the established range 352. The received signal strength of the response message may be used to determine the distance of the device from the user device 344. The received signal strength may be indicated by a received signal strength (RSS) value, a received signal strength indicator (RSSI) value, or other measurement of the power present in a received wireless signal.

Figure 3B:
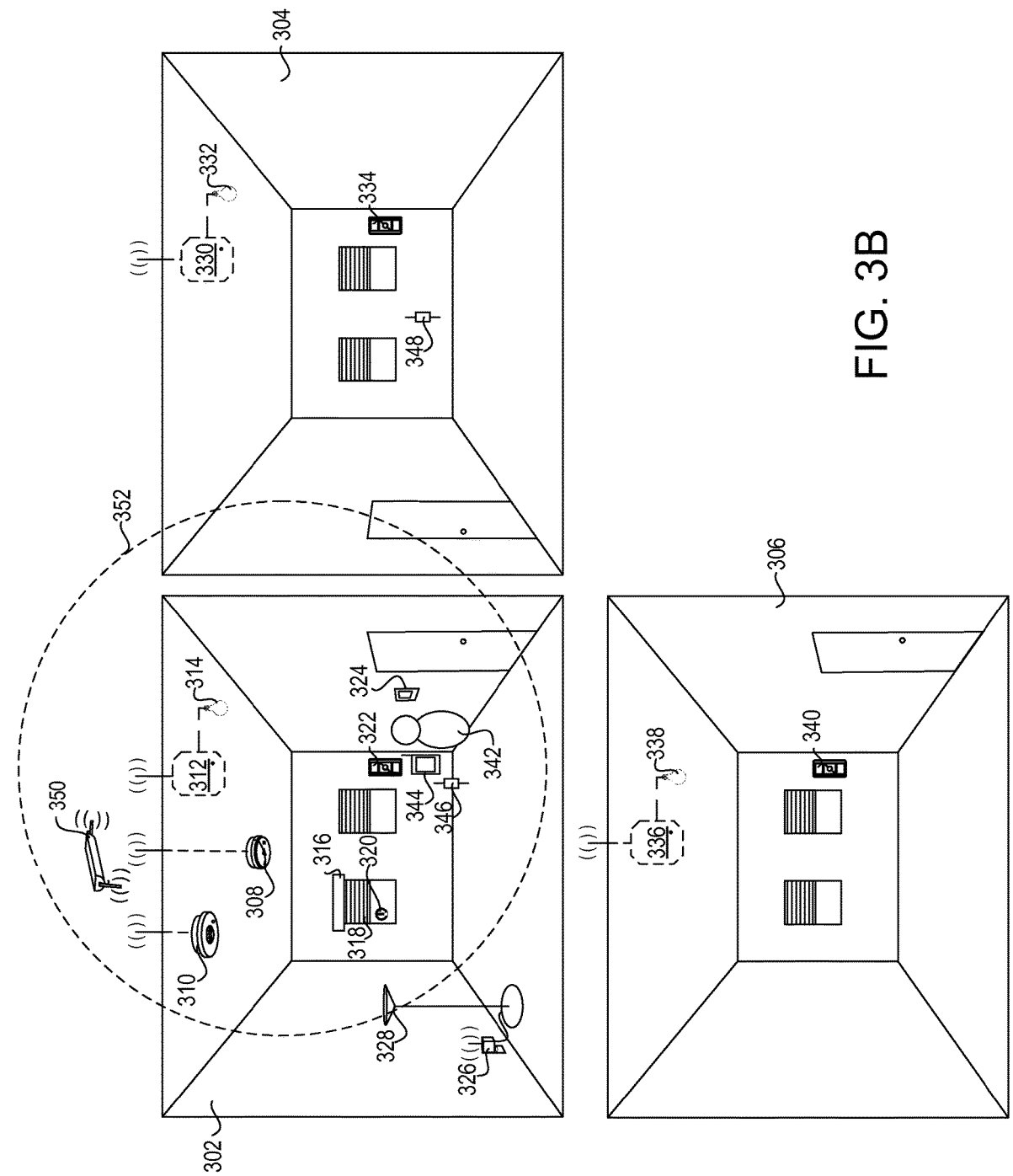

The user device 344 may use the discovery message and the response message received from control devices within the load control system to determine whether the control devices are capable of properly communicating with other control devices within the system. As shown in FIG. 3B, the user 342 may position the user device 344 and/or the communication module 346 at, or near, one of the control devices in the load control system. While the user device 344 and/or the communication module 346 are placed near the remote control device 322 in FIG. 3B, the user device 344 and/or the communication module 346 may be placed at, or near, any device in the load control system. The user 342 may set the established range 352 at, or within, the wireless communication range of the remote control device 322. The user device 344 may send a discovery message within the established range 352. When the user device 344 receives a response message from a two-way communication control device within the load control system, the user device 344 may determine that the control device from which the response message is received is within the wireless communication range of the remote control device 322 and is capable of properly communicating with the remote control device 322. If a two-way communication control device does not respond to the discovery message, the control device may be out of range of the remote control device 322 or may be improperly configured.

The user device 344 may provide an indication to the user 342 of the control devices from which it receives a response message. For example, the user device 344 may receive a response message from the lighting control device 312, the motorized window treatment 316, and/or the broadcaster 350 and may indicate to the user 342 that these control devices are within the established range 352. The user device 344 may identify the type of device responding, the device identifier, the link address for communicating with the device, the communication type (e.g., whether the device is a control-target device, a control-source device, or both), the wireless transmission range of the device, and/or other information about the control device from the response message and may indicate such information to the user 342.

One-way communication control devices (e.g., transmit-only devices) may provide discovery information to the user device 344. The remote control device 322 and/or the occupancy sensor 310 may be examples of one-way communication control devices that may be unable to receive the discovery message from the user device 344. To discover the remote control device 322, the user 342 may actuate a button on the remote control device 322 that may cause the remote control device 322 to send discovery information to the user device 344. To trigger the transmission of discovery information at the occupancy sensor 310, the user 342 may actuate a button on the occupancy sensor 310. The occupancy sensor 310 may be equipped with a laser sensor that may identify a laser signal transmitted from a laser (not shown) held by the user 342. The laser sensor may be used to cause any control device in a difficult to reach location to transmit digital messages. The detection of the laser signal by the laser sensor at a one-way communication control device may trigger the transmission of the discovery information. The discovery information may indicate similar information as indicated by the response to the discovery message, such as the device type, the link address, the device identifier (e.g., serial number), the transmission range of the device, the communication type (e.g., whether the device is a control-target device, a control-source device, or both), and/or other information about the device, for example. While the remote control device 322 and the occupancy sensor 310 may be used as examples of one-way communication control devices, any control device in the load control system may be a one-way or two-way communication control device and may similarly transmit discovery information.

Figure 3C:
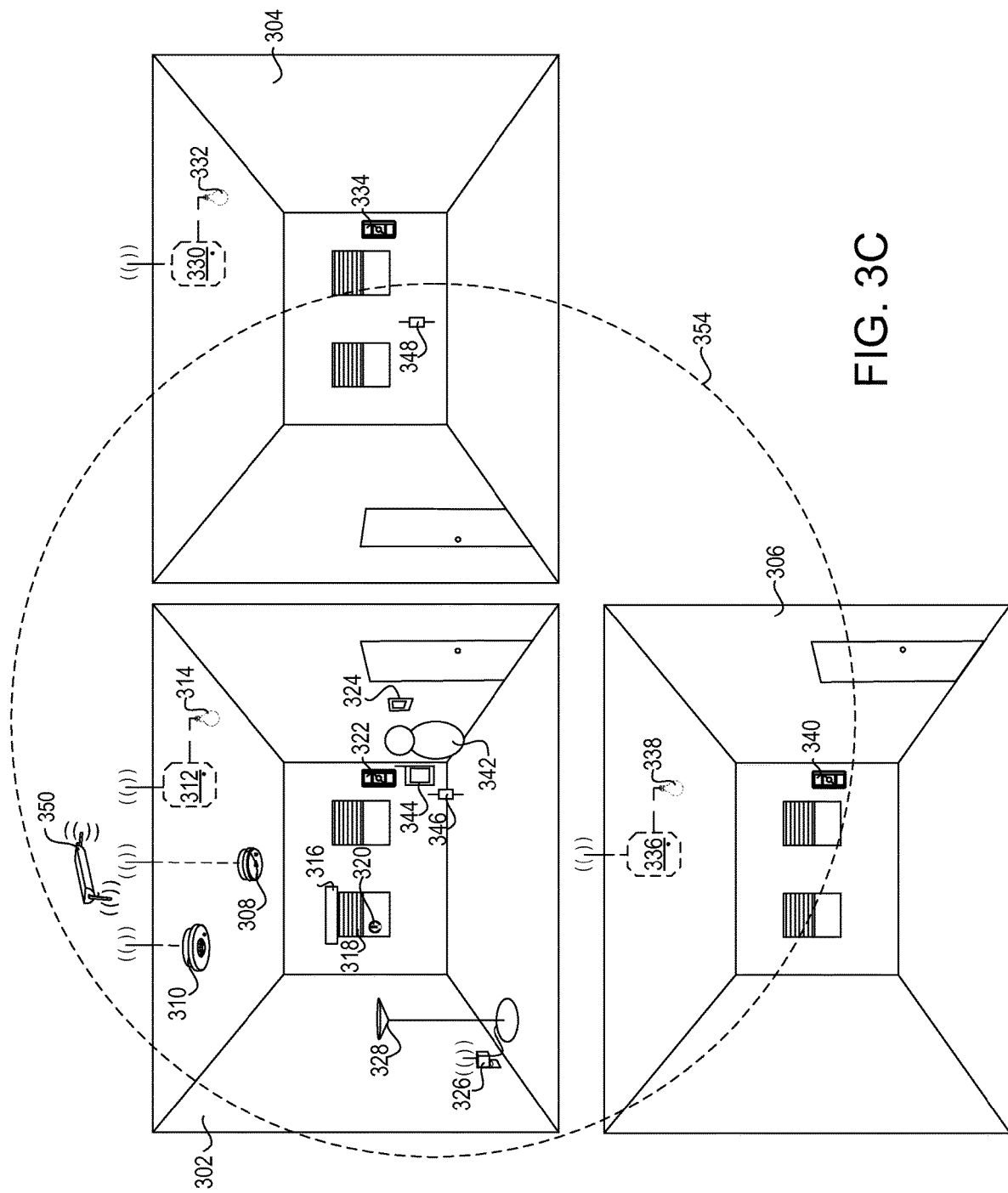

The established range 352 may be adjusted to obtain information from different devices. As shown in FIG. 3C, the established range 352 may be adjusted to send digital messages, such as discovery messages, to different control devices in the load control system. The established range 352 may be increased or decreased. In FIG. 3C, the established range 354 may be increased in size from the size of the established range 352 shown in FIG. 3B. The established range may be increased to allow the user device 344 to communicate with more control devices within the load control system, or decreased to limit the number of devices with which the user device 344 may communicate. For example, the plug-in load control device 326 may be outside of the established range 352 (shown in FIGS. 3A and 3B), but may be within the established range 354 (shown in FIG. 3C) and may receive and/or respond to the discovery messages transmitted within the established range 354.

The established range 352, 354 may also be used to determine whether devices in the load control system are improperly receiving digital messages. For example, the established range 354 may be used to transmit digital messages to the lighting control device 336 that is in the room 306. It may be determined that the lighting control device 336 is improperly receiving digital messages from the remote control device 322 in the room 302 if the lighting control device 336 responds to the discovery message. If the lighting control device 336 is improperly receiving digital messages from the remote control device 322, the location of the remote control device 322 and/or the lighting control device 336 may be moved to a different location, the transmission power of the remote control device 322 may be adjusted, or the lighting control device 336 may be configured to ignore communications from the remote control device 322 (e.g., by disassociating the lighting control device 336 and the remote control device 322).

The user device 344 may use the received signal strength of a signal from devices to determine the distance of the devices from the user device 344 and/or whether devices are within a wireless communication range of one another. The received signal strength may be indicated by an RSS value, an RSSI value, or other measurement of the power present in a received wireless signal. When the received signal strength is used to measure the distance between two devices, the user device 344 may be positioned at the location of one of the devices, or may not be positioned at the location of either device. The user device 344 may receive a user indication (e.g., actuation of a button) that the user is within proximity to a device. The user device 344 may also, or alternatively, transmit a digital message to a two-way communication device and use the response to determine that the user device 344 is within a predefined proximity to the device.

The received signal strength may be calculated at the user device 344 upon receipt of a digital message from a one-way or two-way communication control device. The digital message may be received from a two-way communication control device in response to a discovery message. The digital message may be otherwise triggered from a one-way or two-way communication control device, such as by pressing a button on the control device or activating a sensor (e.g., a laser sensor) at the control device, for example. The user device 344 and/or the communication module 346 may be positioned at a receiving location to determine whether the control device from which the digital message is triggered is capable of transmitting messages to control devices at the location of the user device 344 and/or the communication module 346.

Once it is determined that two control devices are within wireless communication range of one another, the control devices may be installed and/or configured for communication within the load communication system. For example, a control-source device may be installed and may be associated with a control-target device for performing communications. An association procedure may be performed by storing the device identifier of the control-source device on the control-target device and/or by storing the device identifier of the control-target device on the control-source device. The association may enable the control-source device to transmit digital messages to the control-target device and/or enable the control-target device to identify the digital messages from the control-source device. A similar association may be performed between any control devices in the load control system to enable communication between the control devices.

A control-target device may execute load control instructions received in the digital messages from an associated control-source device. For example, the remote control device 322 may instruct the lighting control device 312 to increase or decrease the lighting level of the lighting load 314, instruct the motorized window treatment 316 to raise or lower the covering material 318, instruct the plug-in load control device 326 to raise or lower the lighting level of the floor lamp 328, and/or instruct the temperature control device 324 to raise or lower the temperature in one or more rooms. The occupancy sensor 310 may send similar instructions to a control-target device based on the detection of movement or occupancy within the room 302. The daylight sensor 308 may send similar instructions to a control-target device based on the detection of natural light within the room 302. The shadow sensor 320 may send similar instructions to a control-target device based on a measured level of light received from outside of the room 302.

The user device 344 may be used to determine whether digital messages are properly being transmitted from a control device in the load control system. The user device 344 and/or the communication module 346 may sniff (e.g., listen to the communications on) a communication link between the control devices within the load control system to detect load control messages being transmitted from a control device. For example, the user device 344 may receive digital messages from a control-source device, such as the remote control device 322, to a control-target device, such as the lighting control device 312. The digital messages may be received when they are within the established range 352, 354.

The user device 344 may detect that a digital message is improperly communicated and/or a control device is improperly configured based on the information in the digital message. For example, the user device 344 may detect that the remote control device 340 in the room 306 is sending digital messages to the lighting control device 312 in the room 302 for controlling the lighting load 314. The user device 344 may provide this information and/or an indication to the user 342. From this information it may be determined that the remote control device 340 in the room 306 is improperly associated with the lighting control device 312 in the room 302, rather than the lighting control device 336 in the same room.

The transmission of digital messages may be triggered by sending a triggering message to a control device within the established range 352, 354. For example, the user device 344 may send a triggering message to a control-source device, which is a two-way communication device, to cause the control-source device to send a digital message to a control-target device. For one-way communication devices, such as the remote control device 322 or the occupancy sensor 310 for example, the digital message may be triggered by pressing a button or pointing a laser at a sensor on the device. The user device 344 may listen for the triggered digital message from the control-source device. The user device 344 may detect the triggered digital message based a source device identifier in the digital message, a target device identifier in the digital message, information being transmitted in the message, and/or a proximity in time from transmission of the triggering message to the detection of the triggered digital message.

The user device 344 and/or the communication module 346 may query receiving devices within the load control system to determine whether digital messages are properly being received. For example, the user device 344 may query a control-target device, such as the lighting control device 312, to determine the messages that the control-target device has received. The user device 344 may request the messages received by the control-target device within a period of time (e.g., messages received in the last 30 seconds) and/or the messages received from an identified device, such as an identified control-source device. The receiving device may store a log of the digital messages that it has received and may use the message information in the log to provide requested information to the user device 344.

Based on the message information stored in a receiving device, the user device 344 may determine whether the receiving device is receiving the proper messages. If the receiving device is not receiving messages intended for the receiving device, then the receiving device, or the transmitting device from which the receiving device should be receiving the messages, may be configured. For example, if the receiving device is not receiving messages from a transmitting device, it may be determined that the receiving device is not associated with the transmitting device and the receiving device may then be associated with the transmitting device (e.g., using an association procedure). If the transmitting device is transmitting digital messages to the incorrect device, is not transmitting the digital messages at a proper power level, or is not transmitting the digital messages, the transmitting device may be configured to properly transmit the digital messages to the receiving device.

Control devices in the load control system may provide other information to the user device 344. For example, the battery-powered control devices may report a low battery status to the user device 344. As the user device 344 may sniff messages being transmitted between control devices and/or obtain message information from a receiving device, the low battery status information may be transmitted in digital messages between control devices in the load control system and identified by the user device 344. The digital messages may also provide an indication of the version of firmware being used by a device. The user device 344 may identify the firmware version and may be used to provide updates to control devices in the load control system that are using an older version of firmware.

The user device 344 may communicate with a central processing device via wired or wireless communication. The central processing device may be on-site or at a remote location. The user device 344 may send information to and/or receive information from the central processing device. The information may include device information discovered by the user device 344 and/or a request for information from the central processing device for configuring a control device in the load control system. For example, the user device 344 may discover that a control device is using outdated firmware and may request the updated firmware from the central processing device. The user device 344 may also receive updates for itself from the central processing device. The central processing device may be a broadcaster 350. The broadcaster 350 may broadcast information to one or more control devices within its wireless communication range. The broadcaster 350 may receive information from the user device 344 and/or other devices in a load control system.

The user device 344 and/or the communication module 346 may communicate with the load control devices via the broadcast controller 350. The broadcast controller 350 may include a wireless communication circuit capable of broadcasting information to and/or receiving information from one or more control devices within the wireless communication range of the broadcast controller 350. The user device 344 may be used to discover and/or configure the broadcast controller 350. Examples of the broadcast controller 350 are described in greater detail in commonly-assigned U.S. Non-Provisional patent application Ser. No. 13/725,105, filed Dec. 21, 2012, entitled LOAD CONTROL SYSTEM HAVING INDEPENDENTLY-CONTROLLED UNITS RESPONSIVE TO A BROADCAST CONTROLLER, the entire disclosure of which is hereby incorporated by reference.

Multiple communication modules, such as communication modules 346, 348, may be used for communicating with the user device 344. The communication modules may be installed throughout the rooms 302, 304, and/or 306. The user device 344 may send a broadcast message to discover communication modules 346, 348. An identifier of the communication modules 346, 348 may be stored at the user device 344 for detecting communications from the communication modules 346, 348. An identifier of the user device 344 may be stored at the communication modules 346, 348 for detecting communications from the user device 344.

While FIGS. 3A and 3B illustrate a single user device 344, multiple user devices may be implemented to discover and/or configure devices in the load control system. Each of the user devices may be used by a different user. The user devices may be in communication with one another (e.g., directly or via the Internet) to obtain information retrieved and/or stored at another user device. The user device 344 may discover when the established range 352, 354 overlaps with the established range of another user device and may indicate the overlap to the user 342. The indication may be provided such that the user 342 may move to another location or adjust the established range 352, 354 to avoid discovering, and/or configuring devices in the same area as another user.

Figure 4:
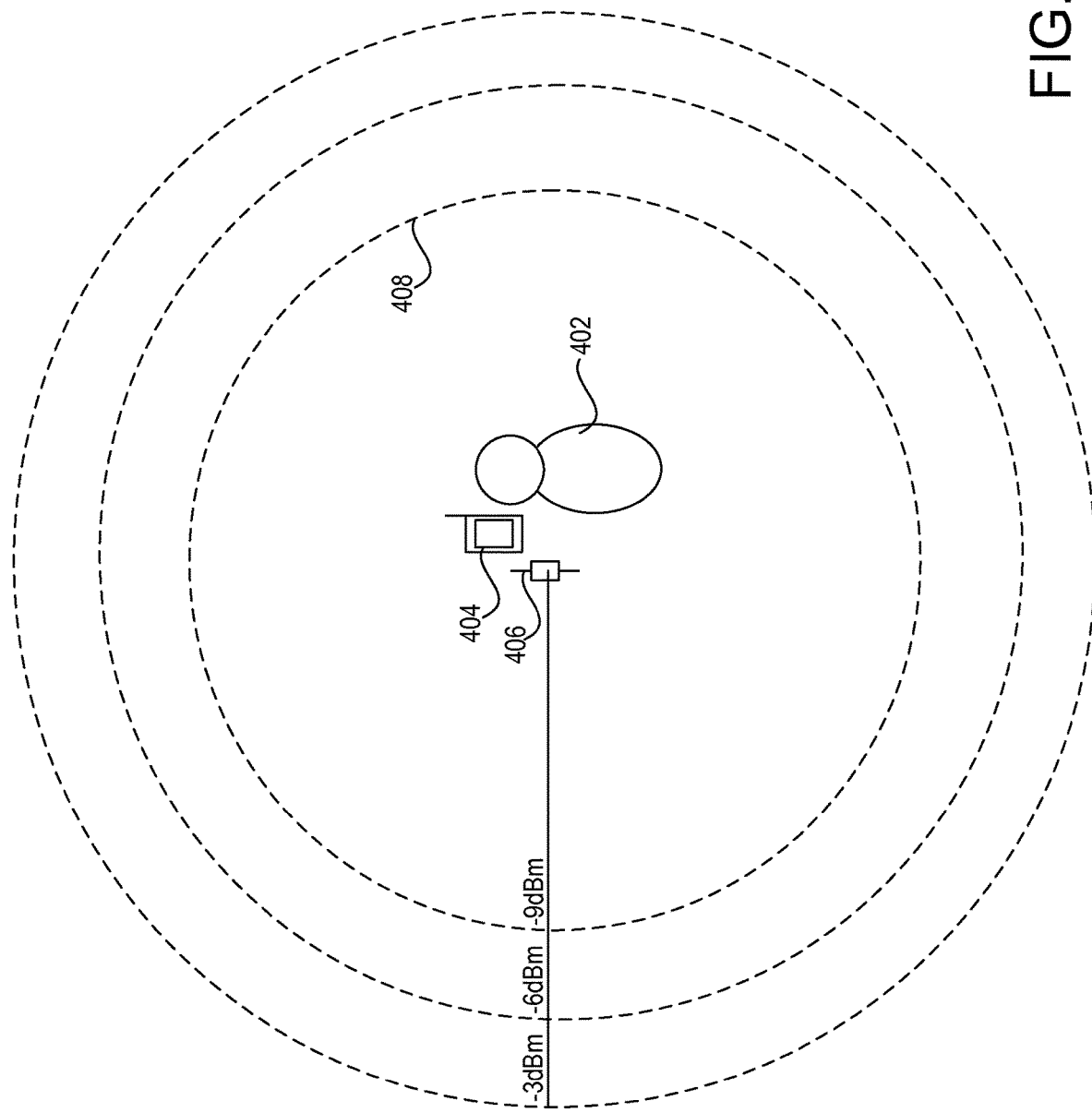
FIG. 4 is a diagram depicting example ranges within which information may be gathered from devices in a load control environment.

FIG. 4 is a diagram depicting example ranges that may be established for performing discovery, configuration, and/or diagnostics for control devices in a load control system. The load control system includes a user device 404 and a communication module 406. As shown in FIG. 4, an established range 408 may be adjustable. A user 402 may increase or decrease the established range 408 (e.g., between −3 dBm and −9 dBm) to discover, configure, and/or diagnose load control devices within a larger or smaller area. The established range 408 may be measured from the communication module 406, the user device 404, or the user 402. For example, the established range 408 may be determined based on the distance that the communication module 406 and/or the user device 404 are configured to transmit and/or receive information.

The established range 408 may be determined by adding to or subtracting from the distance that the communication module 406 and/or the user device 404 are configured to transmit and/or receive information. To determine the established range 408 from the user 402, the distance between the user 402 and the user device 404, or the distance between the user 402 and the communication module 406, may be calculated. The distance from the user 402 may be added to or subtracted from the distance that the user device 404 or the communication module 406 are configured to transmit and/or receive information. To determine the established range 408 from the user device 404, the distance between the user device 404 and the communication module 406 may be added to or subtracted from the distance that the communication module 406 is configured to transmit and/or receive information.

The range 408 may be established by adjusting the signal strength of the signal transmitted by the communication module 406 or the user device 404. For example, the signal strength may be increased or decreased between −9 dBm and −3 dBm. The user device 404 may send digital messages to and/or receive messages from load control devices within the established range 408. The user device 404 may determine the distance to control devices within the established range based on the messages received within, and/or from the control devices within, the established range. The user device 404 may determine the information being transmitted by a control device based on the messages received within the established range 408. The user device 404 may determine the information being received by a control device based on the messages received within, and/or from the control devices within, the established range 408.

The user device 404 may establish the range 408 by disregarding information received from control devices outside of the range 408. For example, the communication module 406 or user device 404 may have a static signal strength of −3 dBm and the established range 408 may be −9 dBm. In this case, the user device 404 may send messages to and/or receive messages from control devices within the −3 dBm area. The user device 404 may determine the distance of each control device based on the received signal strength of the messages from the load control device. When the received signal strength of a control device is below a power threshold, the user device 404 may determine that the control device is outside of the established range 408 (e.g., between −9 dBm and −3 dBm) and may disregard any information received from the control device.

FIGS. 5A-5D depict examples of types of digital messages that may be transmitted and/or received by a user device. FIG. 5A depicts an example of a digital message 500. The digital message 500 may be a discovery message that may be sent from the user device to control devices within an established range of the user device. The digital message 500 may be used to discover control devices, or information about control devices, within the established range. For example, the digital message 500 may be a broadcast message that may be broadcast within the established range and may be responded to by two-way communication control devices that receive the digital message 500. Information about a known control device (e.g., device type, transmission range of the device, messages received at the device, etc.) may also be discovered using the digital message 500.

The digital message 500 may include a source device identifier 502, a target device identifier 504, a message identifier 506, a transmission range identifier 508, and/or a message 510. The source device identifier 502 may include the device identifier of the user device. The target device identifier 504 may include the device identifier of the intended target device to which the digital message 500 may be transmitted. The target device identifier 504 may be included in the digital message 500 to discover information about a known control device. The message identifier 506 may include an identity of the digital message 500. The message identifier 506 may be iterated for each transmission from the user device to indicate the next message transmitted by the user device. The transmission range identifier 508 may indicate a transmission range within which a receiving device may be included in order to respond to the digital message 500. For example, the transmission range identifier 508 may be a received signal strength at which the digital message 500 may be received at a receiving device and the receiving device may compare the received signal strength with the transmission range identifier to determine whether to respond. If the received signal strength is above the threshold indicated by the transmission range identifier, then the receiving device may respond. The message 510 may include information about the user device, information about the load control system, and/or a request for information from the receiving device. The requested information from the receiving device may include a request for a response to the digital message 500 from the receiving device and/or the information to include in the response. The digital message 500 may also include a message type and/or a link address for communicating with the user device directly.

FIG. 5B depicts an example of a digital message 520. The digital message 520 may be a message that may be received at a user device in response to a digital message, such as a discovery message, transmitted from the user device. The digital message 520 may be otherwise triggered from a control device in the load control system, such as by actuation of a button or sensing a laser signal at the control device. The digital message 520 may include a source device identifier 522, a target device identifier 524, a message identifier 526, a transmission range identifier 528, and/or a message 530. The source device identifier 522 may include the device identifier of the source device (e.g., a load control device) from which the digital message 520 may be sent. The target device identifier 524 may include the device identifier of the user device. The message identifier 526 may include an identity of the digital message 520. The message identifier 526 may be iterated for each transmission from the source device to indicate the next message transmitted by the source device. The transmission range identifier 528 may indicate a transmission range of the source device from which the digital message 520 is sent. For example, the transmission range identifier may be a transmission power of the source device from which the digital message may be sent. The message 530 may include information about the source device and/or information about the load control system. The message 530 may include information included in response to a request from the user device. The digital message 520 may also include an identifier (e.g., serial number) that may indicate the model number of the source device, a message type, a link address for communicating with the source device directly, and/or whether the source device is a control-target device or a control-source device.

FIG. 5C depicts an example of a digital message 540. The digital message 540 may be sent from a source device to a target device within the load control system. For example, the digital message 540 may be sent from a control-source device to a control-target device for controlling an electrical load. The digital message 540 may be sniffed by the user device on a communication link between the control-source device and the control-target device. The digital message 540 may include a source device identifier 542, a target device identifier 544, a message identifier 546, a sequence number 548, and/or a message 550. The source device identifier 542 may include the device identifier of the source device (e.g., a control-source device) from which the digital message 540 may be sent. The target device identifier 544 may include the intended target device (e.g., a control-target device) for the digital message 540. The message identifier 546 may include an identity of the digital message 540. The message identifier 546 may be iterated for each transmission from the source device to indicate the next message transmitted by the source device. The sequence number 548 may indicate a position of the message 540 in a sequence of digital messages transmitted from a source device. The sequence number 548 may be iterated for each message transmitted from the source device to the target device and/or having the same message type as other messages in the sequence. For example, the sequence number 548 may be iterated after each transmission of an occupancy or vacancy condition at an occupancy sensor to indicate to a receiving device the message number in a given sequence of messages for a single event (e.g., occupancy or vacancy). The message 550 may include information being sent from the source device to the target device. The message 550 may include load control information from a control-source device to a control-target device. The digital message 540 may also include an identifier (e.g., serial number) that may indicate the model number of the source device, an identifier (e.g., serial number) that may indicate the model number of the target device for receiving the digital message 540, a message type, and/or whether the source device is a control-target device or a control-source device.

FIG. 5D depicts an example of a digital message 560. The digital message 560 may be a triggering message for triggering transmission of messages between devices within the load control system. For example, the digital message 560 may be sent to trigger transmission of a digital message from a control-source device to a control-target device. The digital message 560 may include a source device identifier 562, a target device identifier 564, a message identifier 566, and/or a message 568. The source device identifier 562 may include the device identifier of the user device. The target device identifier 564 may include the device identifier of the intended target device to which the digital message 560 may be transmitted. The message identifier 566 may include an identity of the digital message 560. The message identifier 566 may be iterated for each transmission from the user device. The message 568 may include triggering information for triggering a message from the receiving control device to another control device in the load control system. The message 568 may indicate the message type or the type of information to transmit in response to the digital message 560. For example, the message 568 may include information that may trigger an occupancy sensor to transmit an occupancy condition. The triggered digital message may be obtained by the user device (e.g., by sniffing the communication or obtaining the message from another control device that received the message) and may be used to determine whether the transmitting and/or the receiving device are operating correctly. The triggered digital message may be identified based on the time period from which the digital message 560 was sent and when the triggered digital message was transmitted or received.

While digital messages 500, 520, 540, and 560 in FIGS. 5A-5D may include a number of message fields, any number or combination of fields may be included in a digital message. For example, where a digital message is a broadcast message, the target device identifier may not be included in the digital message. Each field in the digital messages 500, 520, 540, 560 may include one or more bits in a bit sequence.

Figure 6:
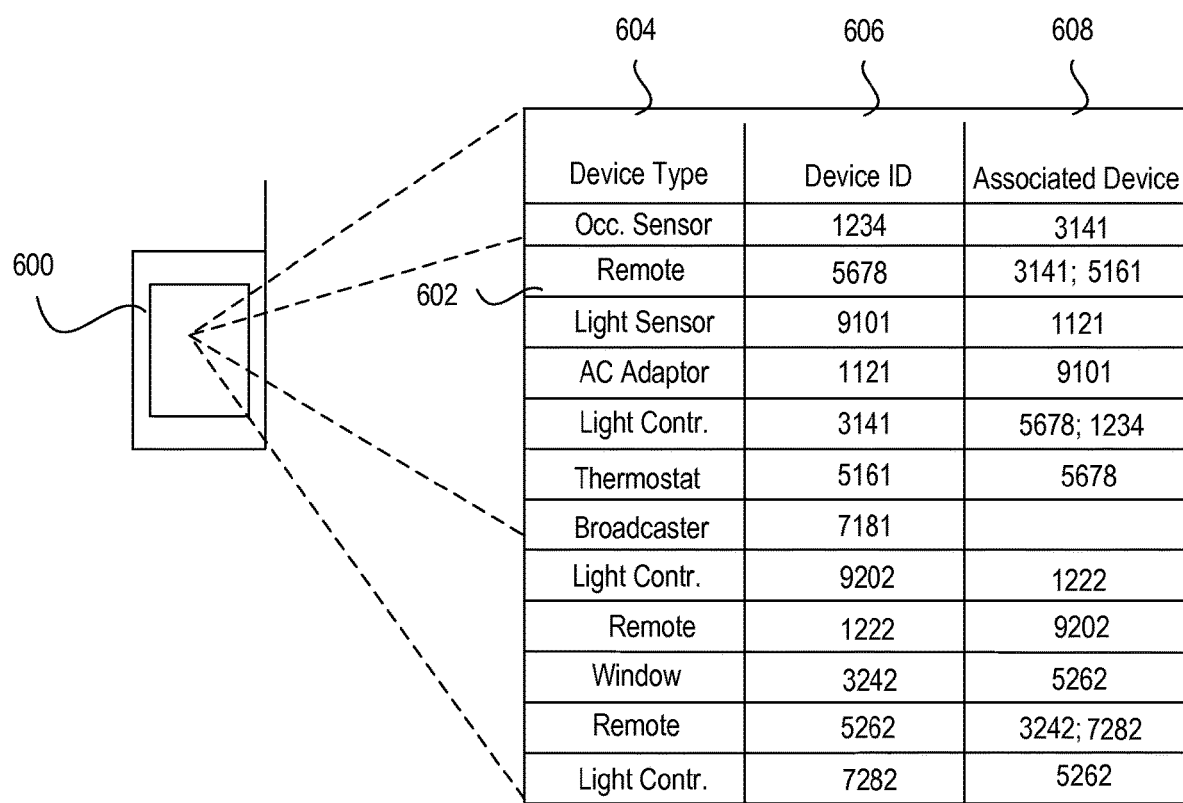
FIG. 6 is a diagram that depicts an example device for identifying devices and/or messages transmitted from devices in a load control environment.

The user device may determine whether a digital message is being properly communicated from a control-source device to a control-target device by comparing the target device identifier in a digital message with the device identifiers of known devices in the load control system. FIG. 6 depicts an example of a device table 602 that may be used by a user device 600 to identify control devices within the load control system. The device table 602 may be stored at the user device 600 at the time of manufacture, or upon later configuration. The device table 602 may include a device type 604, a device identifier 606, and/or associated devices 608 for control devices in the device table 602.

The user device 600 may compare the information in the device table 602 with the information in received or sniffed digital messages to determine whether the information in the digital messages is correct and/or whether the source device of the digital message is operating correctly. The information in the digital messages may be correct if the digital message is sent to the proper target device. The user device 600 may compare the target device identifier in a digital message with the device identifiers 606 in the device table 602 to determine whether the target device of a digital message is a control device that is known to the user device 600. The user device 600 may compare the device identifiers known to be within an established range. The user device 600 may compare the source device identifier in a digital message with the device types 604 to determine whether the source device is a known device. The user device 600 may compare the target device identifier in a digital message from a source device with the associated devices 608 of the source device to determine whether the source device is transmitting a message to an associated device. The user device 600 may also analyze the messages and/or message types to determine whether the proper information is being sent from the source device and/or to the target device. By comparing the device identifiers, the user device 600 may determine that a source device is not communicating with the proper target device or any target device within the established range (e.g., transmitting digital messages with an incorrect target device identifier) and may configure the source device to transmit to the proper target device (e.g., by associating the proper target device in the established range with the source device). If the source device is transmitting improper information to a target device, the source device may be configured to transmit the proper information.

Figure 7:
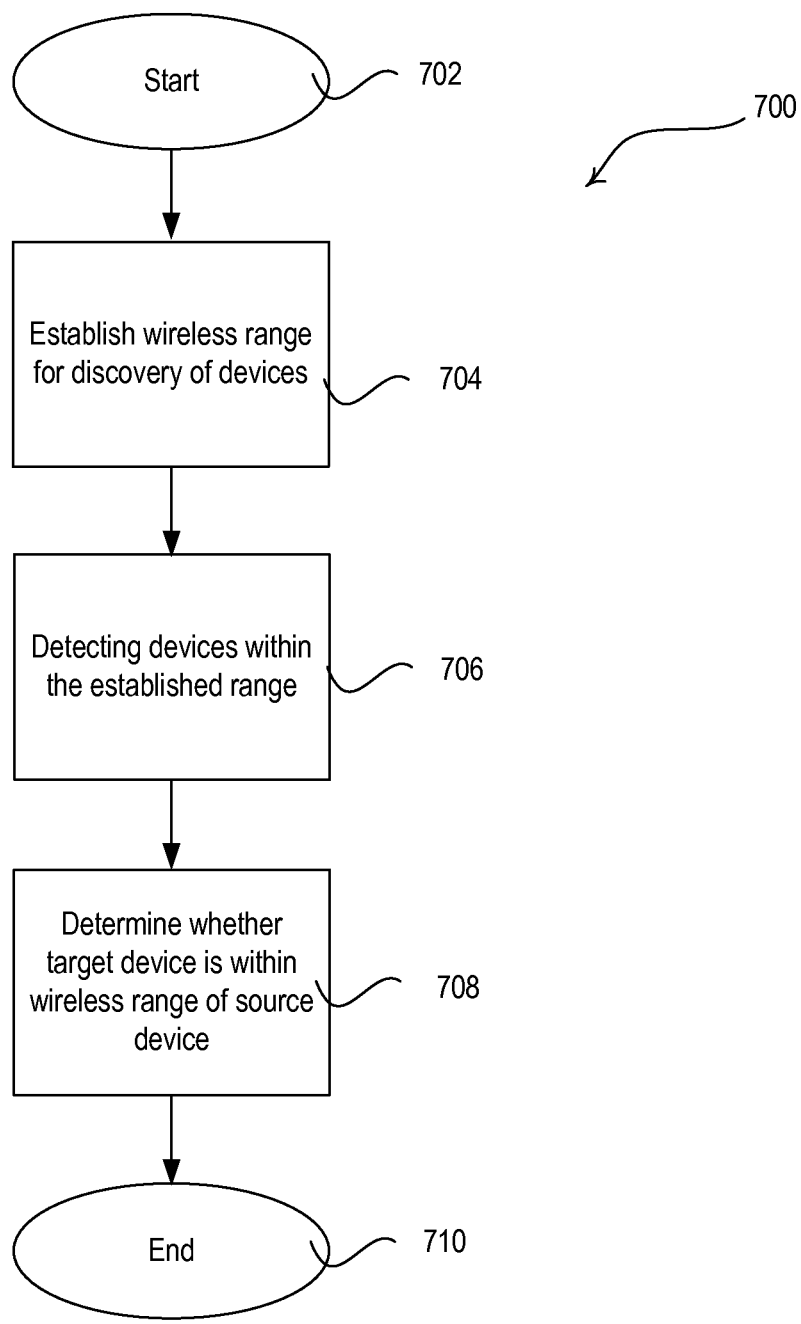
FIG. 7 is a simplified flow diagram for discovering control devices within a wireless range.

FIG. 7 is a simplified flow diagram of a method 700 for discovering control devices within a wireless range. The method 700 may begin at 702. At 704, the user device may establish a wireless range for discovery of control devices. The established range may be adjustable to larger or smaller ranges. The user device may detect control devices within the established range at 706. For example, the user device may send a discovery message within the established range and may receive a response message from two-way communication devices within the established range.

At 708, the user device may be used to determine whether a target device is within a wireless transmission range of a source device that may attempt to communicate with the target device. For example, the user device may be placed at, or near, the location of the source device and may transmit a digital message to the target device. To determine whether the target device is capable of receiving a digital message from the source device, the established range may be at, or within, the wireless transmission range of the source device. The digital message transmitted from the user device may be configured similar to a digital message transmitted from the source device. If the target device responds, or the message is stored at the target device, it may be determined that the target device is capable of receiving communications from the source device.

The user device may also be used to determine whether the target device is within a wireless transmission range of a source device based on digital messages received from the control devices. For example, the user device may use the received signal strength of a digital message received from the source device and the received signal strength of a digital message received from a target device and may determine the distance to each device. If the distance between the devices is shorter than the wireless communication range of the source device from which a digital message may be transmitted, the devices may be within a wireless communication range of one another. The wireless communication range of the source device may be communicated in the digital message received by the user device, or the wireless communication range may be pre-stored on the user device. The method 700 may end at 710.

Figure 8:
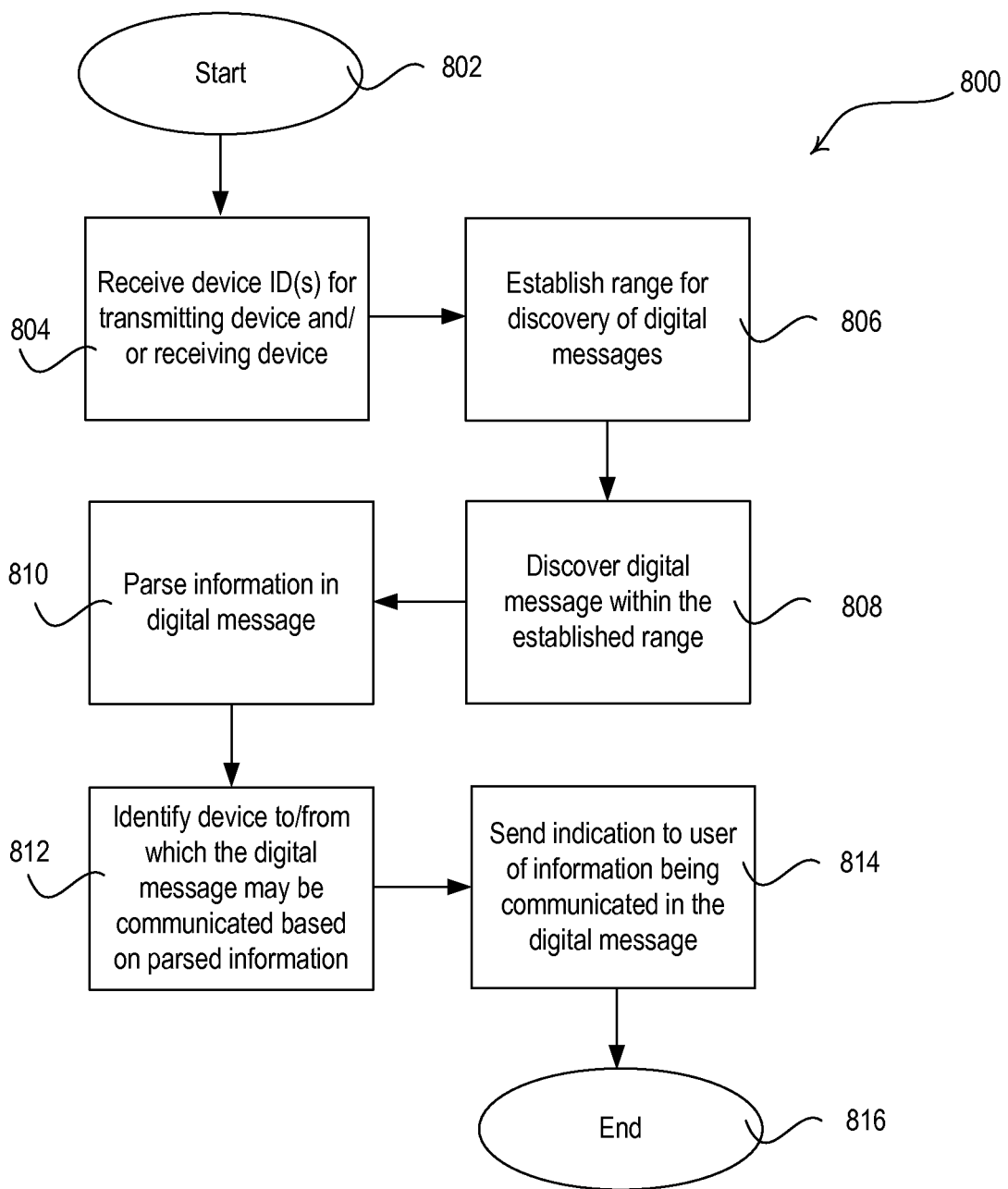
FIG. 8 is a simplified flow diagram for discovering digital messages transmitted in a load control environment and indicating the information in the digital messages to a user.

FIG. 8 is a simplified flow diagram of a method 800 for discovering digital messages transmitted in a load control environment and indicating the information in the digital messages to a user. The method 800 may begin at 802. At 804, the user device may receive device identifiers for control devices within a load control system. The control devices may be devices for transmitting and/or receiving digital messages within the load control system. The digital messages may include load control instructions for controlling an electrical load. The user device may establish a wireless range at 806 for discovering the digital messages being transmitted. At 808, the user device may discover the digital messages within the established range of the user device. The user device may discover the digital messages by sniffing communication links between transmitting devices and receiving devices.

The user device may parse the information in the digital message at 810. For example, the user device may parse a source device identifier, a target device identifier, a message identifier, a message type, a sequence number, a message, and/or the like. At 812, the user device may identify the source device identifier and/or the target device identifier. The user device may use the target device identifier, the source device identifier, and/or other information in the digital message to determine whether the digital message is being properly communicated and/or whether the digital message includes the proper information for controlling devices in the load control system. For example, the user device may compare the source device identifier and/or the target device identifier with a list of known devices in the load control system to determine whether the source device and/or the target device are known devices in the load control system. The user device may determine whether the target device is associated with the source device for receiving digital messages from the source device. The user device may determine whether the message information (e.g., load control instructions) being transmitted to the target device is proper.

The user device may provide an indication to the user of the information identified in the digital message at 814. For example, the user device may display the source device identifier, the target device identifier, and/or the message being sent to the target device for the user to determine whether the digital message includes the proper information. The user device may also independently identify whether the digital message is being communicated correctly and/or whether the digital message includes the proper information (e.g., load control instructions) for being communicated between the identified devices. The user device may provide an indication of whether or not the digital message is being properly communicated and/or includes the proper information. The method 800 may end at 816.

Figure 9A:
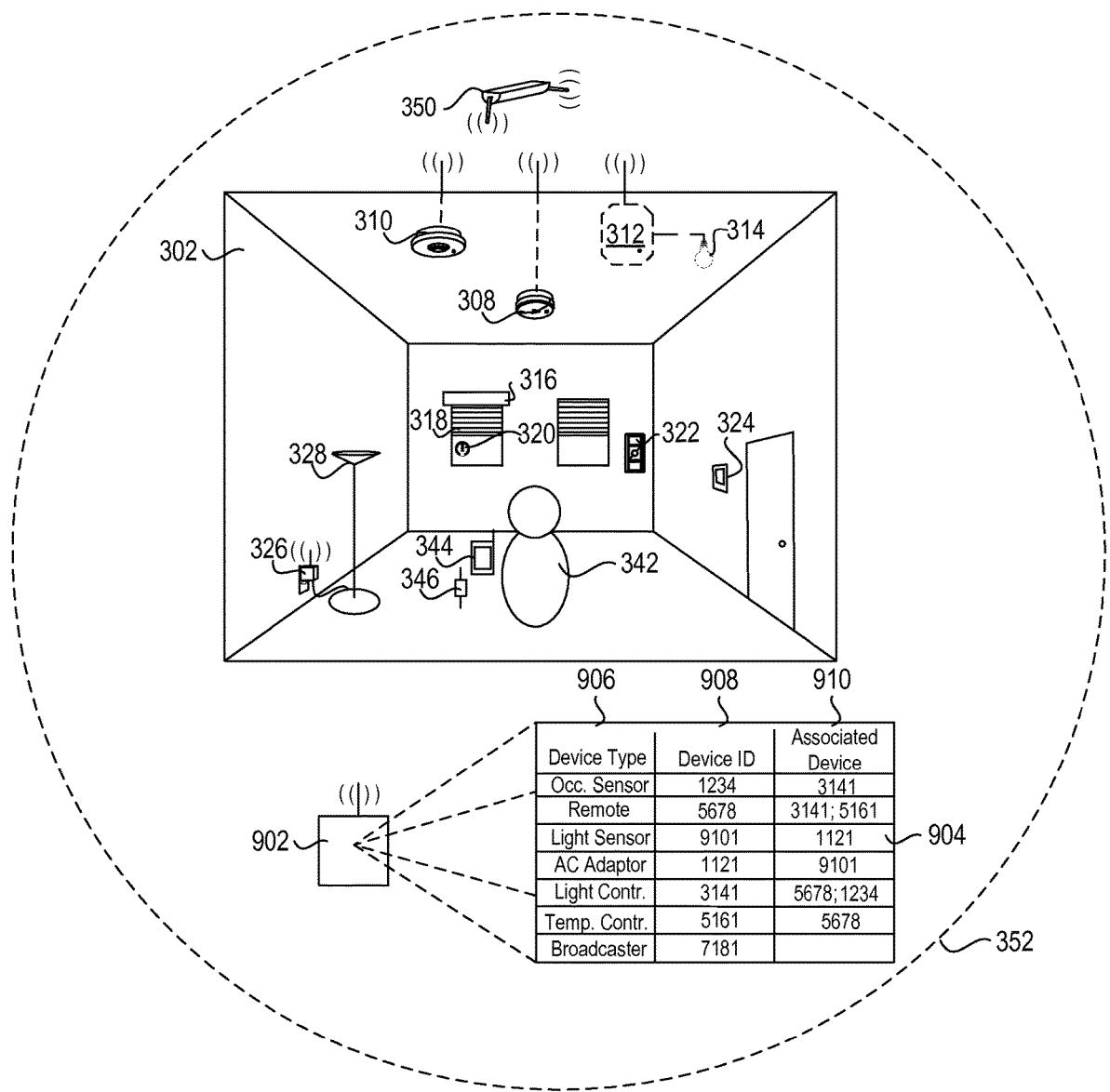
FIGS. 9A and 9B depict example load control environments in which device information may be provided to a user device.
Figure 9B:
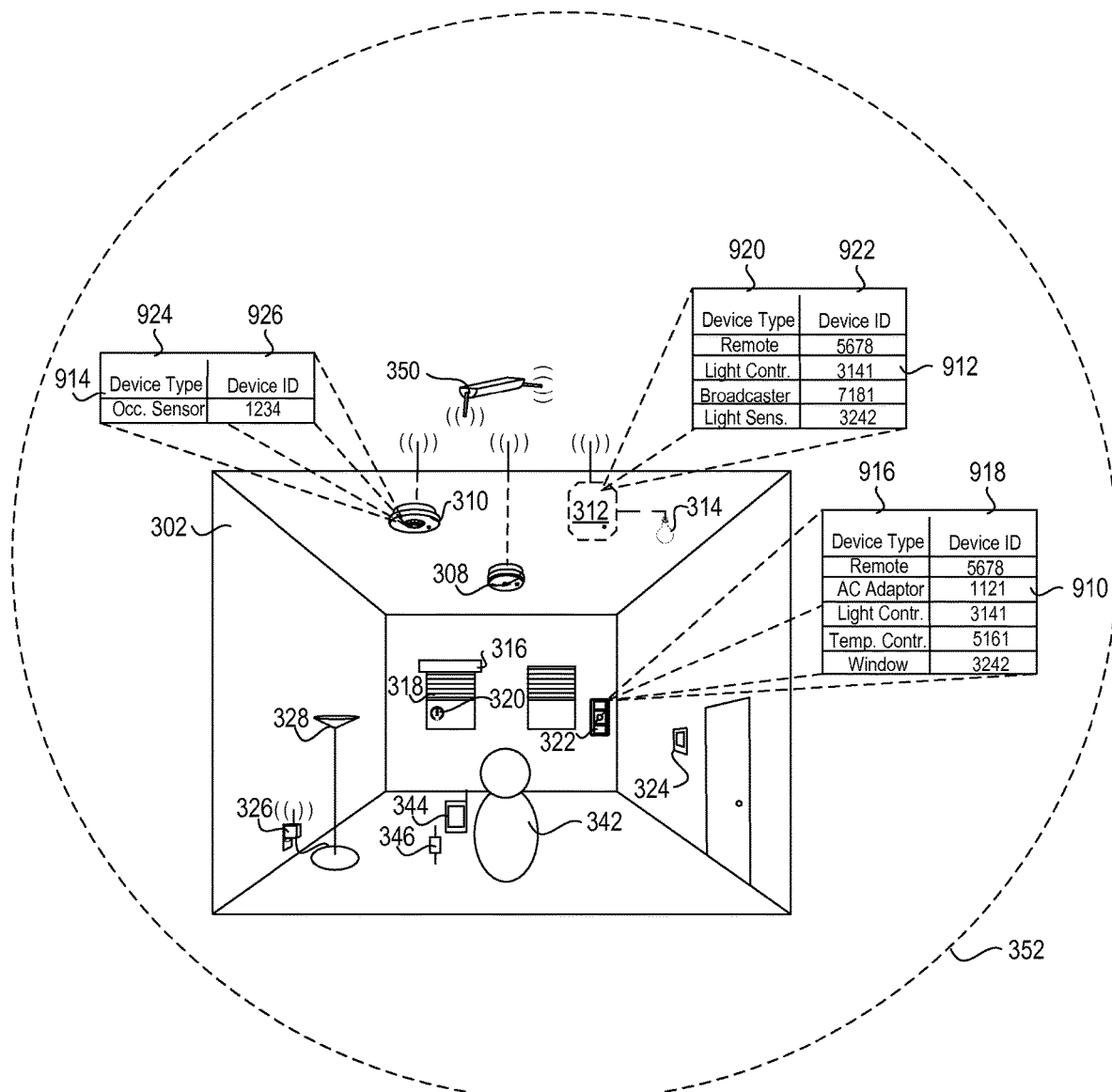

The list of other control devices in the load control system may be pre-stored on the user device, such as at the time of manufacture, the list may be stored on the user device as an update, or the list may be obtained from other devices in the load control system. FIGS. 9A and 9B depict example load control environments in which device information may be provided to a user device 344. As shown in FIG. 9A, the device information for the control devices in a load control system may be stored at a central controller 902. The central controller 902 may be a server or other central processing entity, such as a broadcast control device. The central controller 902 may be within or outside of the established range 352. For example, the central controller 902 may reside at a remote location and may be capable of communicating with the user device 344 via the Internet.

The list of control devices in the load control system, and associated information, may be stored in a device table 904. The device table 904 may include a device type 906, a device identifier 908, and/or associated devices 910 for the control devices listed in the device table 904. The device table 904 may also include an identifier (e.g., serial number) that may indicate the model number of a control device, a link address for communicating with the device directly, and/or the communication type (e.g., whether the control device is a control-target device, a control-source device, or both). The device table 904 may include one-way communication devices, two-way communication devices, control-source devices, control-target devices, and/or other control devices in a load control system.

The user device 344 may receive the list of the control devices in the load control system, or portions thereof, from the central controller 902. The device table 904 may be provided in response to a request (e.g., a discovery message) from the user device 344. The user device 344 may compare device identifiers of received messages against the information received from the central controller 902 to determine whether the control devices in the load control system are operating correctly.

As shown in FIG. 9B, the device information for the control devices in a load control system may be obtained from various control devices within the load control system. The user device 344 may obtain device identifiers from the control devices themselves or the control devices with which they are associated. For example, the user device may obtain the device information for the occupancy sensor 310 directly from the occupancy sensor 310. The occupancy sensor 310 may have a device table 914 stored thereon that may include its device identifier and/or other information about the occupancy sensor. The device table 914 may also include an identifier (e.g., serial number) that may indicate the device type of the occupancy sensor 310, a link address for communicating with the occupancy sensor 310 directly, and/or the communication type (e.g., whether the device is a control-target device, a control-source device, or both).

Control devices in the load control system may also be able to provide information on associated control devices with which the control devices are configured to communicate. For example, the lighting control device 312 may store device information for itself, as well as the device information for associated control devices, such as the remote control device 322, the occupancy sensor 310, and/or the daylight sensor 308. The lighting control device 312 may have a device table 912 stored thereon that may include its device type 920, device identifier 922, and/or other information about the lighting control device 312. The device table 912 may also include association information for the control devices, an identifier (e.g., serial number) that may indicate the model number of the control devices in the device table 912, a link address for communicating with devices directly, and/or the communication type (e.g., whether the devices are control-target devices, control-source devices, or both). As the lighting control device 312 may be a control-target device, the lighting control device 312 may store information for the control-source devices with which the lighting control device 312 is associated.

The user device 344 may also obtain device information from a control-source device, such as the remote control device 322. The remote control device 322 may store device information for itself, as well as the device information for associated control devices, such as the plug-in load control device 326, the lighting control device 312, the temperature control device 324 (e.g., thermostat), and/or the motorized window treatment 316. The remote control device 322 may have a device table 910 stored thereon that may include its device type 916, device identifier 918, and/or other information about the remote control device 322. The device table 910 may also include association information for the control devices, an identifier (e.g., serial number) that may indicate the model number of the control devices in the device table 910, a link address for communicating with devices directly, and/or the communication type (e.g., whether the devices are control-target devices, control-source devices, or both). As the remote control device 322 may be a control-source device, the remote control device 322 may store information for the control-target devices with which the remote control device 322 is associated.

The device tables 910, 912, 914 may be provided to the user device 344 in response to a request (e.g., discovery message) from the user device 344, upon actuation of a button on the control devices on which the device tables 910, 912, 914 are stored, upon triggering a laser sensor on the control devices on which the device tables 910, 912, 914 are stored, or another triggering mechanism. The user device 344 may obtain similar device information from other control devices in the load control system. The control devices from which the device information is obtained may be within the established range 352. The control devices within the established range 352 may receive a digital message (e.g., discovery message) from the user device 344 requesting the device information. In response, each control device may send the device information to the user device 344. Any device in the load control system may provide similar device information to the user device 344 as described herein.

Figure 10:
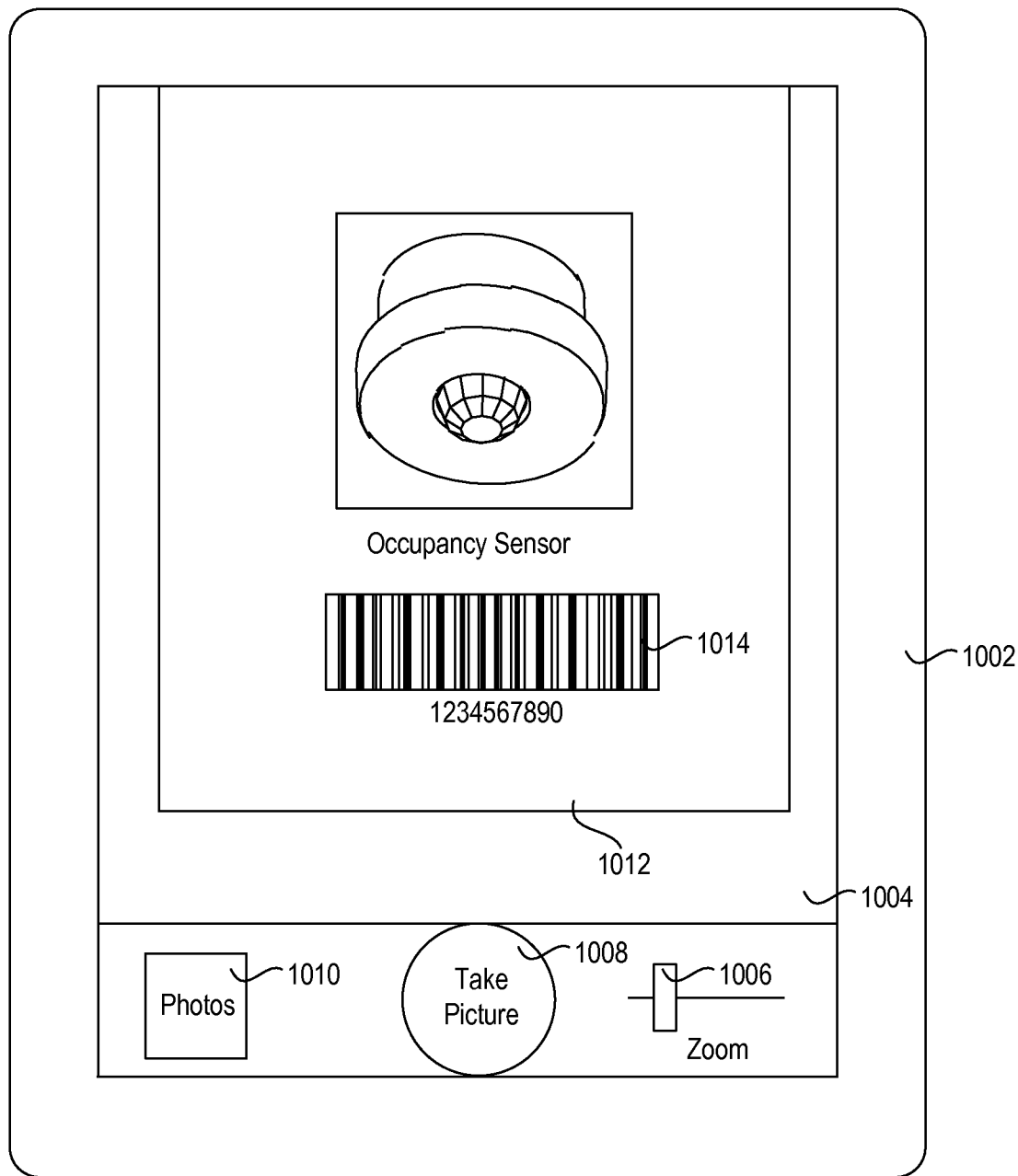
FIG. 10 depicts an example user device for identifying device information.

FIG. 10 depicts an example user device 1002 for identifying device information. The user device 1002 may include a digital camera (not shown) for capturing digital images, a display 1004 for displaying the digital images captured by the digital camera, a button 1008 for taking the digital images with the digital camera, a zoom button 1006 for zooming in or out, and/or a photo button 1010 for accessing and/or viewing digital images. The user device 1002 may capture digital images of a control device, a device barcode 1014 or serial number, or device packaging 1012.

The user device 1002 may be used to retrieve device information based on the digital image. The user device 1002 may identify a control device by retrieving information associated with the picture from internal storage or by sending the picture to a remote location to retrieve the device information. For example, the user device 1002 may send the picture to a remote server that may be used to lookup the device information based on the digital image. The device information may be provided to the user device 1002 and may be stored on the user device for identifying digital messages and/or the devices to or from which the digital messages are transmitted. The user device 1002 may include the device information in a device table stored on the user device 1002.

Figure 11:
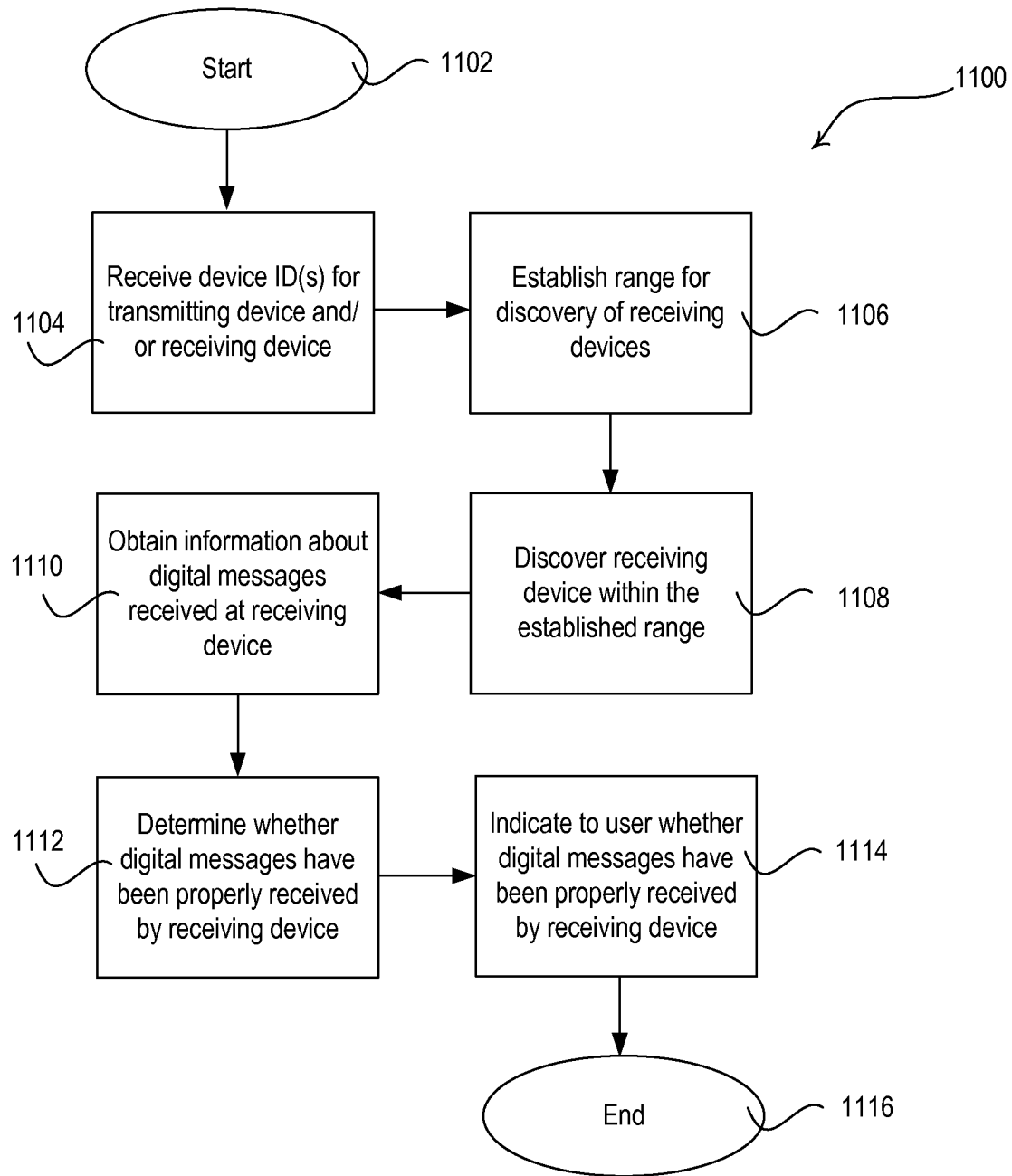
FIG. 11 is a simplified flow diagram for determining whether digital messages have been received at a device in a load control environment.

FIG. 11 is a simplified flow diagram depicting a method 1100 for determining whether digital messages have been received at a control device in a load control environment. As shown in FIG. 11, the method 1100 may begin at 1102. At 1104, a user device may receive device identifiers for transmitting devices and/or receiving devices in the load control system. The user device may establish a range at 1106 for discovery of receiving devices in the load control system. At 1108, the user device may discover a receiving device within the established range. The receiving device may be a control device that has received digital messages from a transmitting device in the load control system. For example, the receiving device may be a control-target device for receiving digital messages from a control-source device.

The user device may obtain information about the digital messages received at the receiving device at 1110. The receiving device may maintain a log of messages that have been received by the receiving device. The information about the digital messages stored at the receiving device may be obtained by the user device at 1110 in response to a triggering message transmitted from the user device. The information about the digital messages stored at the receiving device may be otherwise obtained at 1110 in response to actuation of a button at the receiving device, triggering a sensor (e.g., a laser sensor) at the receiving device, or another triggering operation.

At 1112, the user device may determine whether digital messages have been properly received by the receiving device. The user device may determine that the receiving device is not the proper device for receiving the digital messages. For example, the user device may determine that the receiving device is not associated with the transmitting device. The user device may determine that the information (e.g., load control information) in the received digital messages is improper for controlling the receiving device. For example, the information in the digital messages received from an occupancy sensor may include an indication that the load control environment is unoccupied even though the load control environment is occupied. The discovered message information may be used to determine that the transmitting device may be misconfigured.

The user device may determine, at 1112, that the receiving device has not received particular digital messages. Some digital messages may be paired together, such that after receiving one of the messages another one of the paired messages should be received. The user device may determine that a digital message has not been properly received when one of the paired messages has not been received at the receiving device. For example, the user device may identify that a lighting control device has received consecutive vacancy conditions from an occupancy sensor without receiving an occupancy condition. Occupancy conditions may be sent by an occupancy sensor in a digital message at predefined intervals over the period of time (e.g., in the form of a heartbeat) in which a space may be occupied. A vacancy condition may be sent in a digital message after occupancy has been detected and when an occupancy sensor fails to detect occupancy in a space over a predefined period of time since the last occupancy condition. The user device may count the number of consecutive digital messages received at a control device that include vacancy conditions to determine the number of missed occupancy conditions. The user device may identify that the lighting control device has received consecutive button press indicators from a remote control device, without receiving a button release indicator. The user device may identify that the lighting control device has received a stop indicator that indicates that a user has stopped pressing a button on a remote control device without receiving a raise indicator or a lower indicator from a remote control device that indicates a user has pressed a raise or lower button, respectively, for adjusting the intensity of the lighting load. The user device may determine that the receiving device has received a digital message triggered by a button being pressed twice without receiving the digital message triggered when the same button is pressed the first time. A device, such as a remote control device, may be programmed to transmit a digital message upon a single press of a button and transmit another message upon a second press of the button within a predefined period of time. A receiving device may receive the message transmitted on the first press of the button and may ignore this message if the second message is received within a predefined period of time from the receipt of the first message. Similar determinations may be performed by a receiving device and may be provided to the user device. If digital messages are not being received at the intended receiving device, the user device may determine that the digital messages are being improperly communicated (e.g., distance between devices is too great, digital messages are being directed to another device, etc.), the transmitting device is improperly configured (e.g., digital messages are not being generated or transmitted), or the batteries are dead in the transmitting or the receiving device.

At 1114, the user device may indicate to a user whether the digital messages have been properly received by a receiving device. The user device may provide the information retrieved from the receiving device and/or indicate digital messages that are being improperly received or are not being received. The method 1100 may end at 1116.

FIG. 12 depicts an example of the type of message information that may be maintained at a receiving device in a load control system. The information may be maintained in a table 1200. While the table 1200 may be maintained by a control-target device and may include indications from an occupancy sensor, a remote control device, and a daylight sensor, a similar table may be maintained by any receiving device in a load control system capable of receiving digital messages. The table 1200 may include a device type 1202 and/or a device identifier 1204 that may indicate a source device from which a digital message may be received. The table 1200 may include an event number 1206. The event number 1206 may indicate one or more messages received from the same device for a single event. The event number 1206 may be iterated at the receiving device to indicate a sequence of messages received by the transmitting device for performing an identified event (e.g., occupancy or vacancy at an occupancy sensor, a button press at a remote control device, etc.). The receiving device and/or the user device may determine that a digital message was generated and/or transmitted, but not received by the receiving device when the event number 1206 has been skipped for a device. As shown in table 1200, the receiving device has received a first, third, and fourth message in a sequence of messages from an occupancy sensor. Based on the event number 1206 indicated in the messages received from the occupancy sensor, the user device, and/or the receiving device, may determine that the second message, or sequence of messages, for an event in the message sequence (e.g., an occupancy event) has not been properly received by the receiving device. This may be indicated to the user by displaying the information in the table 1200 or by indicating to the user explicitly that the second message in the sequence of messages from the occupancy sensor has not been received.

The table 1200 may include a message identifier 1208. The message identifier 1208 may be iterated at the transmitting device upon the transmission of a message to track the messages transmitted by the device. The message identifier 1208 may be used to identify whether the messages have been properly generated at the transmitting device. As the message identifiers 1208 include a sequence of messages from the occupancy sensor that skip a message identifier number (e.g., 2346), it may be determined that a message was properly generated at the occupancy sensor, but was not received at the receiving device.

The table 1200 may include a received messages 1210. The received messages 1210 may indicate the instructions that may be sent to the receiving device. For example, the received messages 1210 may include load control instructions and/or an indication of an input or a condition identified at a transmitting device (e.g., a control-source device) that may be used for executing load control instructions at the receiving device (e.g., a control-target device). The received messages 1210 may be used to identify whether the messages have been properly transmitted from the transmitting device or received at the receiving device. As the received messages 1210 include a sequence of messages from the occupancy sensor that indicate a vacancy condition, without an intervening occupancy condition, it may be determined that a message was improperly generated at the occupancy sensor or was not received at the receiving device. While the occupancy sensor and the occupancy/vacancy events are used as examples, similar analysis may be performed using the information in the table 1200 to determine whether digital messages are properly being transmitted by or received from other load control devices.

As described above, the table 1200 may be stored at a control-target device that may be associated with an occupancy sensor, a remote control device, and/or a daylight sensor. The detected occupancy condition, instructions from the remote control device, and/or the lighting threshold may be used to increase or decrease a lighting level at a lighting control device, raise or lower a covering material using a motorized window treatment, and/or increase or decrease a temperature in a load control environment using a temperature control device. Increasing the lighting level may include increasing a dimming level or turning on a lighting load. Decreasing the lighting level may include decreasing the dimming level or turning off the lighting load.

The table 1200 may include one or more of the fields illustrated in FIG. 12, but is not limited to including such fields. For example, the table 1200 may include an identifier (e.g., serial number) that may indicate the model number of the source device from which a message is received, a message type, a link address for communicating with the source device directly, and/or whether the device is a control-target device or a control-source device.

Figure 13A:
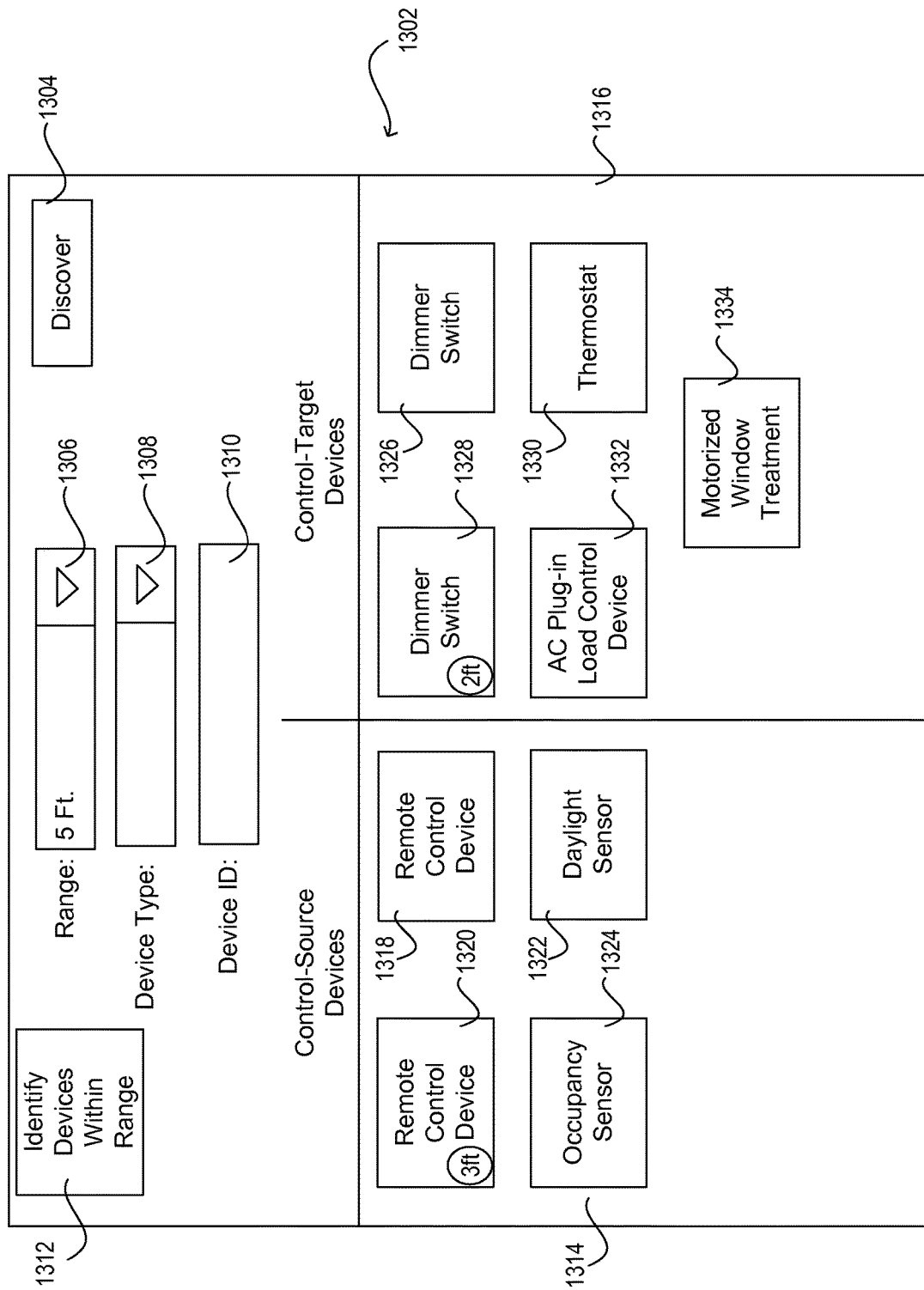
FIGS. 13A and 13B depict example GUIs that may be used to detect devices within a wireless range.
Figure 13B:
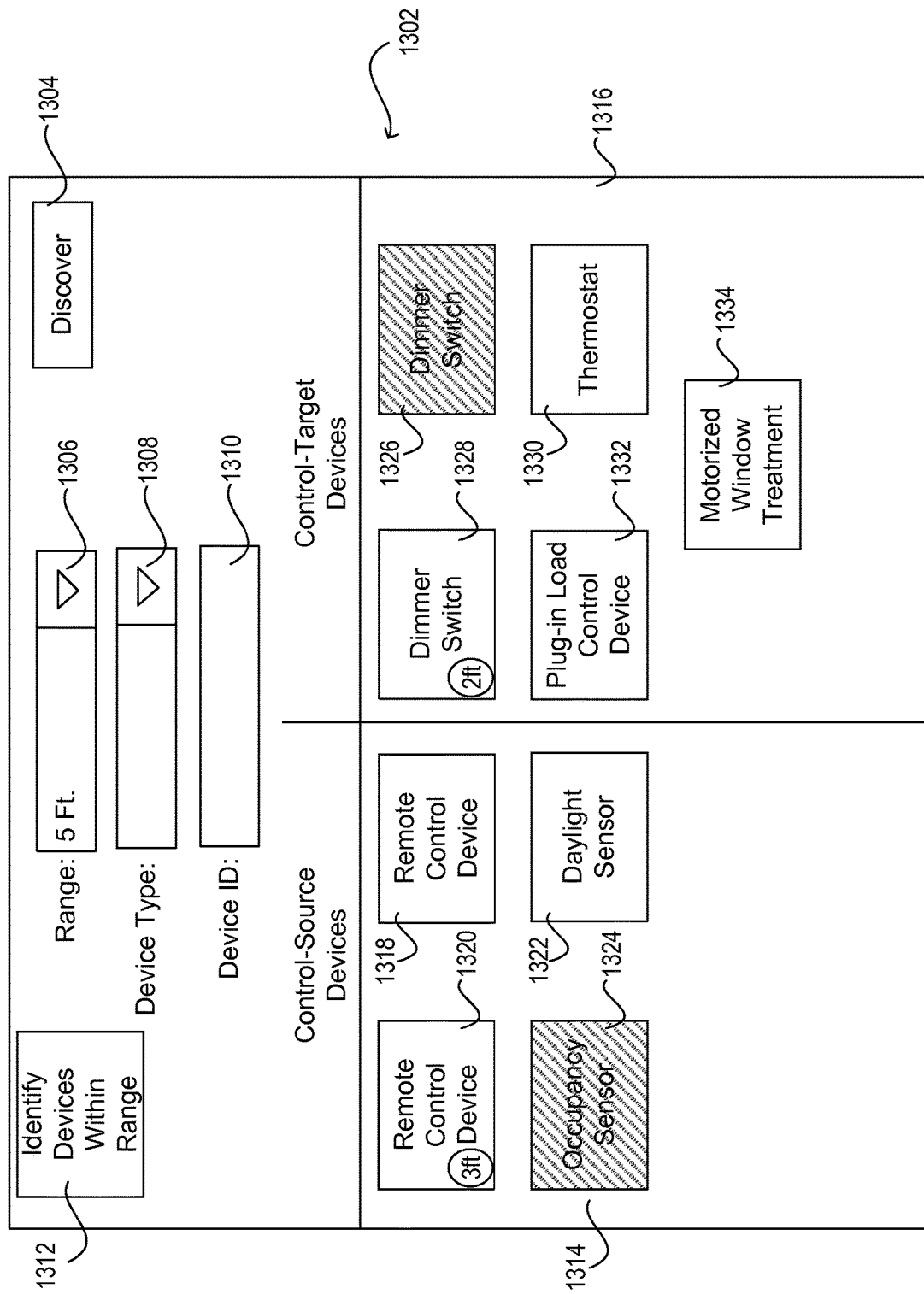

FIGS. 13A and 13B depict an example graphical user interface (GUI) 1302 that may be used for discovering, configuring, and/or diagnosing devices in a load control system. The GUI 1302 may include a discover button 1304 for sending a discovery message, various criteria 1306, 1308, 1310 for discovering devices, an identification button 1312 for causing a device to identify itself, and/or discovered devices 1318, 1320, 1322, 1324, 1326, 1328, 1330, 1332, 1334. The wireless communication range 1306 of the user device may be established using a dropdown box or other button (not shown) on the GUI 1302. The established range 1306 may be configurable based on the transmit power of the communication module or the user device, or by disregarding messages received from outside of the established range 1306. For example, if the communication module is capable of transmitting and/or receiving transmissions up to a distance of twenty feet, the transmission and/or receiving range 1306 may be established incrementally between zero and twenty feet. The discovery button 1304 may be selected for transmitting a discovery message to devices within the established range 1306. The discovered devices within the established range 1306 may be displayed for identification, configuration, and/or diagnosis.

Other criteria may be used for discovering devices in the load control system. The discovery message may include the other criteria and a device that meets the other criteria may respond to the criteria. In another example, the discovered devices may be filtered by the other criteria after sending a digital message to the user device. The other criteria may include a device type 1308 and/or a device identifier 1310. The device identifier 1310 may be used to discover one or more devices having a known identifier. The device type 1308 may include more general device types, such as load control devices, control-source devices, or control-target devices, or more specific device types, such as a lighting control device, a motorized window treatment, a plug-in load control device, a remote control device, a temperature control device (e.g., thermostat), a daylight sensor, a shadow sensor, or an occupancy sensor, for example. The device type 1308 may be limited to devices capable of two-way communication, but the user device on which the GUI 1302 may be displayed may be able to receive digital messages from one-way communication devices for discovery.

The discovered devices may be displayed on the GUI 1302. The GUI 1302 may indicate the device type for discovered devices and/or whether the devices are control-source devices 1314 or control-target device 1316. As shown in FIG. 13A, the discovered devices may include the remote control device 1318, the remote control device 1320, the daylight sensor 1322, the occupancy sensor 1324, the dimmer switch 1326, the dimmer switch 1328, the thermostat 1330, the plug-in load control device 1332, and/or the motorized window treatment 1334. While the displayed devices include load control devices, the GUI 1302 may be used to discover other devices within the load control system, such as a broadcast control device or a central controller.

The GUI 1302 may be used to identify the discovered devices within a load control environment. For example, upon selection of a discovered device and/or an identification button on the GUI 1302, the user device may transmit an identification message to selected devices instructing the devices to identify themselves to the user. The selected devices may identify themselves visually or audibly. The identification may be performed on the discovered device, or a device with which the discovered device is associated. For example, the remote control devices 1318, 1320 may identify themselves by flashing an indicator light, providing an indication on a display, or providing an indication via an associated control-target device. The daylight sensor 1322 and the occupancy sensor 1324 may identify themselves by flashing an indicator light or providing an indication via an associated control-target device. The dimmer switches 1326, 1328 may identify themselves by flashing a corresponding lighting fixture. The thermostat 1330 may identify itself by flashing an indicator light, providing a message on the thermostat 1330 display, and/or providing an identification via the HVAC system controlled by the thermostat 1330. The thermostat 1330 may provide an indication via the HVAC system by turning the HVAC system on or off, increasing or decreasing the temperature of the HVAC system, or the like. The plug-in load control device 1332 may identify itself via a display, an indicator light, or a device that is plugged into the plug-in load control device 1332. For example, the plug-in load control device 1332 may flash a lighting fixture of a lamp plugged into the plug-in load control device 1332, flash an indicator light on a device plugged into the plug-in load control device 1332, or the like. The motorized window treatment 1334 may identify itself by moving the corresponding covering material that it controls. For example, the motorized window treatment 1334 may jog the covering material up and down a predefined distance, wiggle the covering material, or tilt the covering material.

The GUI 1302 may indicate whether the discovered devices may be within a transmission range of the user device. As the established range 1306 may be set, the user device may determine that the devices that respond to the discovery message within the established range are within the established range from the user device. The GUI 1302 may also display the distance of discovered devices based on the received signal strength of a signal on which a digital message may be received. For example, the GUI 1302 illustrates the distance of the remote control device 1320 and the dimmer switch 1328 from the user device.

The GUI 1302 may indicate whether the discovered devices may be within a transmission range of one another. For example, a user may select a button 1312 for identifying discovered devices that are within a wireless communication range of one another. The user device may use the received signal power of each device to determine the distance of each device from the user device. The user device may use the distance of each device from the user device to determine the distance between each device (e.g., such as when the user device is located at a device). The user device may know the wireless communication range of each device and may indicate to the user when the distance between the devices is at, or within, the wireless communication range of at least one of the devices. For example, the user device may determine whether the distance between a control-source device 1314 and a control-target device 1316 is less than the wireless communication range of the control-source device 1314, such that the control-target device 1316 may receive load control instructions from the control-source device 1314.

As shown in FIG. 13B, the GUI 1302 may indicate the devices that are within a wireless communication range. In FIG. 13B, the occupancy sensor 1324 and the dimmer switch 1326 are indicated as being within a wireless communication range of one another. The occupancy sensor 1324 or the dimmer switch 1326 may be selected by a user prior to selecting the button 1312 and the user device may determine whether any devices are within the wireless transmission range of the selected devices. The occupancy sensor 1324 and the dimmer switch 1326 may be selected by a user prior to selecting the button 1312 and the user device may determine whether the selected devices are within the wireless transmission range of one another.

One or more fields associated with the discovered load control devices may be configured using the GUI 1302. For example, a load control device may be renamed using the GUI 1302. Control-source devices 1314 and/or control-target devices 1316 may be renamed for better identification or distinction. For example, the remote control device 1318 may be renamed to indicate the location of the remote control device or the location of the devices that the remote control device is configured to control, such as the "Living Room Remote Control." Similarly, control-target devices 1316 may be renamed to indicate the location of the control-target device and/or the load that is being controlled. For example, the dimmer switch 1326 may be renamed as the "Kitchen Dimmer."

The load control devices may be selected to configure other fields associated therewith, such as the device name, the device type, the associated devices, the link address for communicating with the device, the communication type (e.g., whether the device is a control-target device, a control-source device, or both), and/or other information about the device. The configuration information may be provided to a device. For example, if the user device is used to determine that a control device is associated with the wrong device in a load control system, the association may be changed using the GUI 1302 and may be provided to the device.

The GUI 1302 may be used to create a common interface across load control devices and/or load control systems. The GUI 1302 may display control-source devices 1314 and/or control-target devices 1316 based on the one or more parameters associated with the devices. The GUI 1302 may display control-source devices 1314 and/or control-target devices 1316 based on the location of the devices. For example, the GUI 1302 may display control-source devices 1314 and/or control-target devices 1316 for a room or a subset of rooms, a floor or a subset of floors, a zone or subset of zones, or the like. The GUI 1302 may display control-source devices 1314 and/or control-target devices 1316 based on a device type. For example, the GUI 1302 may display the control-source devices 1314 or the control-target devices 1316 independently. The GUI 1302 may display the device types, such as the lighting control devices, motorized window treatment, thermostats, plug-in load control devices, etc., independently.

Figure 14A:
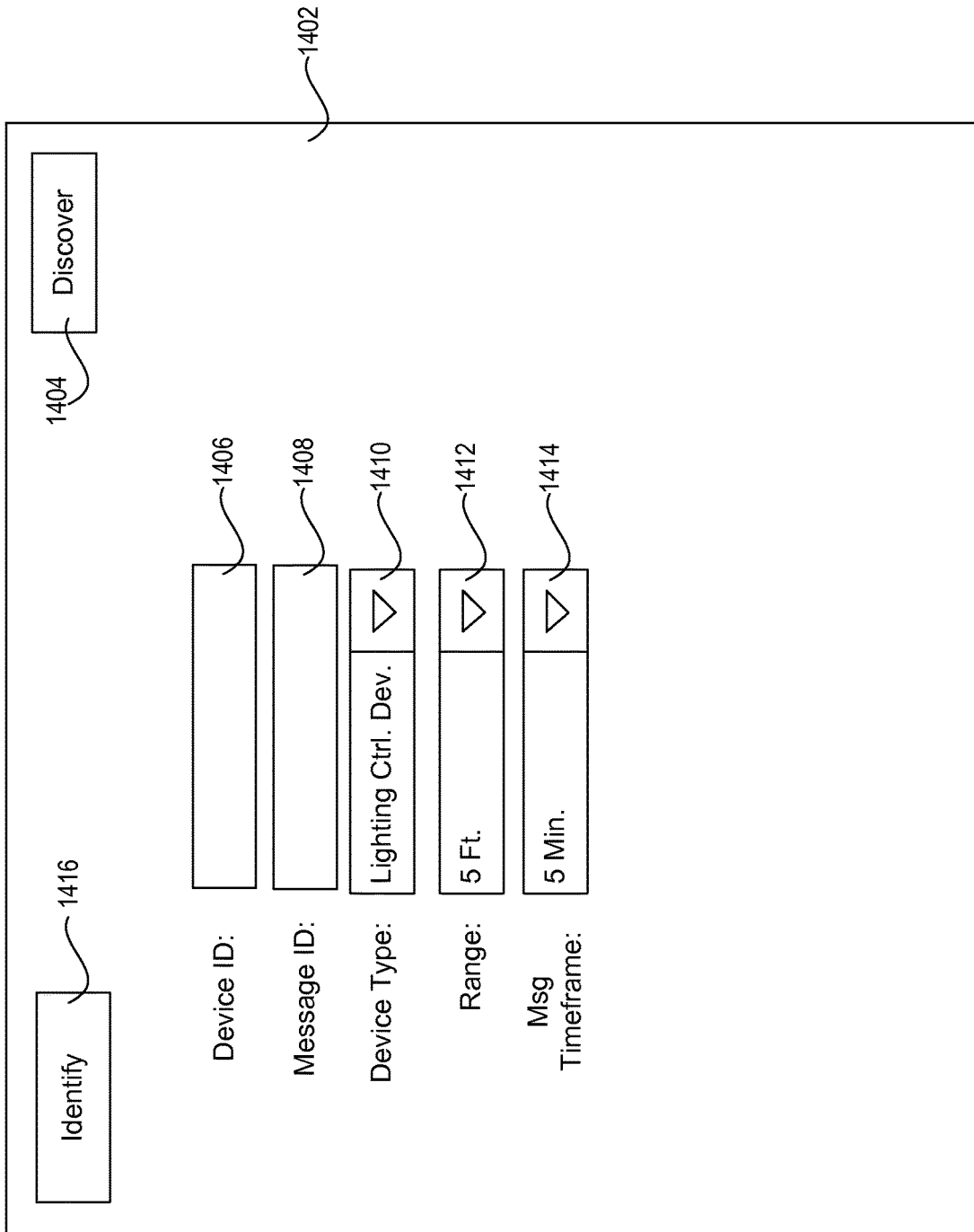
FIGS. 14A and 14B are example GUIs that may be used to detect digital messages received by a device.
Figure 14B:
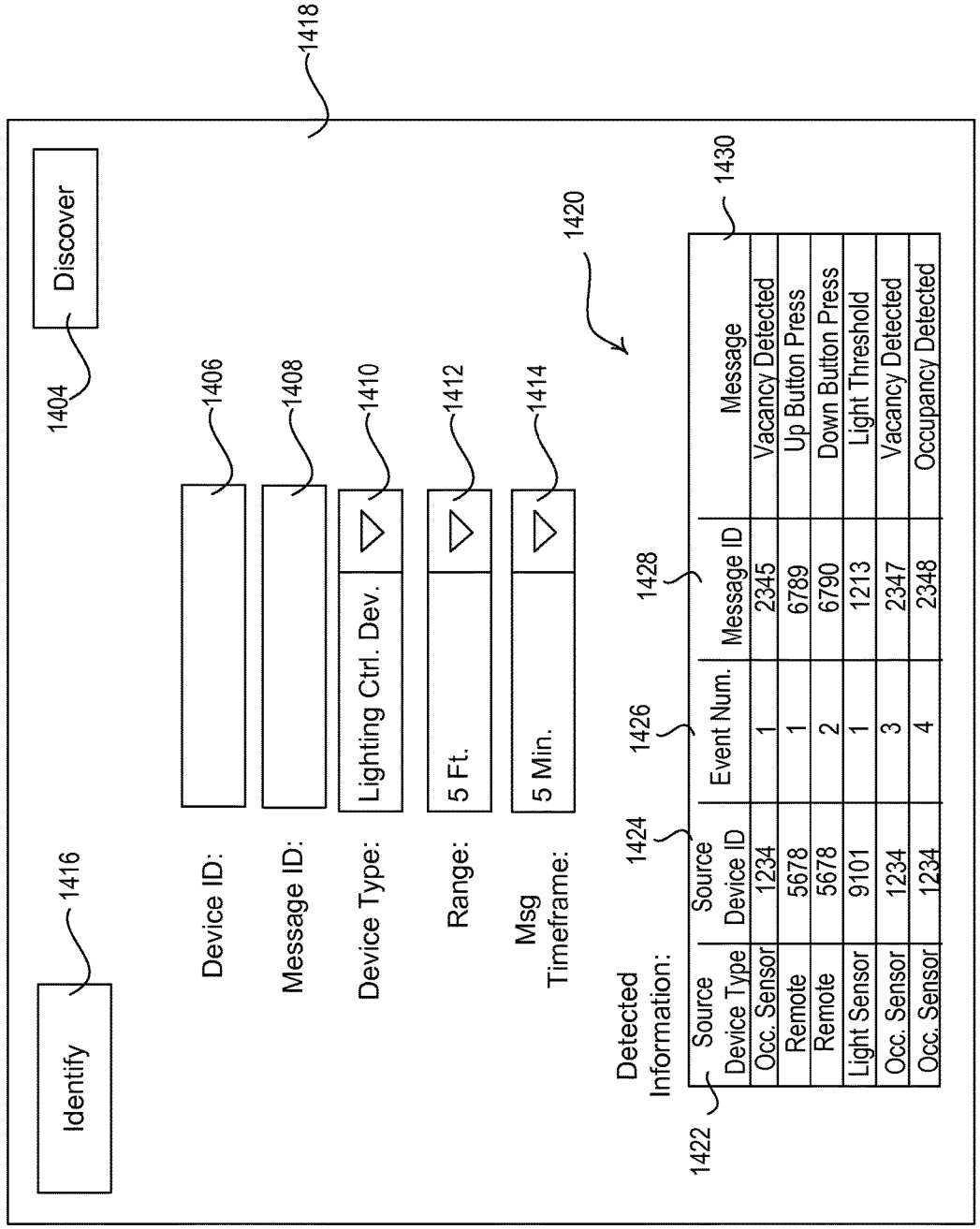

FIGS. 14A and 14B depict an example GUI 1402 that may be used for obtaining message information from control devices in a load control system. A user may select the message information to be obtained using various criteria. Message information may be provided for a device having an identifier 1406, a message having a message identifier 1408, a selected device type 1410, messages stored on devices within an established range 1412, and/or messages received by a control device within an identified timeframe 1414. The device type 1410 may include more general device types, such as load control devices, control-source devices, or control-target devices, or more specific device types, such as a lighting control device, a motorized window treatment, a plug-in load control device, a remote control device, a temperature control device (e.g., thermostat), a daylight sensor, a shadow sensor, or an occupancy sensor, for example. The device type 1410 may be limited to control devices capable of two-way communication for sending a discovery message to retrieve message information, but the user device on which the GUI 1402 may be displayed may be able to receive message information from one-way communication devices and may display such information on the user device.

The GUI 1402 may be used to identify control devices within a load control environment. The control devices may be identified to determine the criteria for obtaining the message information from a device. Upon selection of an identification button 1416 on the GUI 1402, the user device may transmit an identification message to control devices having the selected criteria. The identification message may instruct the control devices to identify themselves to the user. The selected devices may identify themselves visually or audibly. The identification may be performed on the control device itself, or a control device with which it is associated. For example, a control-source device may identify itself via an associated control-target device.

The discovery button 1404 may be selected to discover message information stored at a control device. Upon selection of the discovery button 1404, a discovery message may be sent to control devices within the established range 1412. The discovery message may include the other selected criteria, such as the device identifier 1406, the message identifier 1408, the device type 1410, and/or the message timeframe 1414. Two-way communication devices having the selected criteria may respond to the discovery message. The control devices may provide the message information having the selected criteria. For example, when the device type 1410 is set to a lighting control device, the established range 1412 is set to a five foot range, and the message timeframe 1414 is set to a five minute timeframe, the lighting control devices within a five foot range that are capable of two-way communication may respond with the stored messages that have been received in the last five minutes. Devices may provide message information upon receipt of another triggering event, such as actuation of a button on the control device or sensing a laser signal at the control device.

FIG. 14B depicts a GUI 1418 that may display the message information 1420 that may be received from other control devices. The message information 1420 may include a source device type 1422, a source device identifier 1424, an event number 1426, a message identifier 1428, and/or a message 1430. The message information 1420 may also include an identifier (e.g., serial number) that may indicate the model number of the source device, a message type, and/or whether the source device is a control-target device or a control-source device. The message information 1420 may be used to determine whether a source device and a target device are properly configured to perform communications in a load control system. For example, the message information 1420 indicates that the control device from which the message information 1420 was obtained failed to receive the second message in a sequence of messages from an occupancy sensor. The failed receipt of the digital message may be due to an improper configuration at the source device and/or an improper configuration at the target device. The source device and/or the target device may be configured to enable proper communication of digital messages between the control devices.

Figure 15:
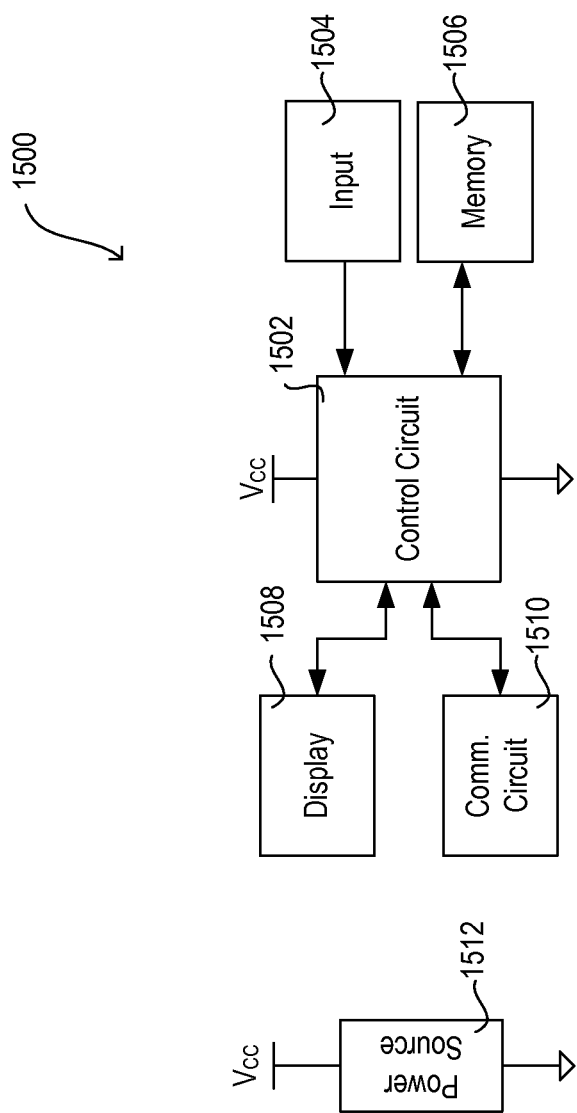
FIG. 15 is a block diagram illustrating an example user device.

FIG. 15 is a block diagram illustrating an example user device 1500, which may be deployed as, for example, the user device 344 of the load control system of FIG. 3A. The user device 1500 may include a control circuit 1502 for controlling the functionality of the user device 1500. The control circuit 1502 may include one or more general purpose processors, special purpose processors, conventional processors, digital signal processors (DSPs), microprocessors, integrated circuits, a programmable logic device (PLD), application specific integrated circuits (ASICs), or the like. The control circuit 1502 may perform signal coding, data processing, power control, input/output processing, or any other functionality that enables the user device 1500 to perform as described herein. The control circuit 1502 may store information in and/or retrieve information from a memory 1506. The memory 1506 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The user device 1500 may include a communication circuit 1510 for transmitting and/or receiving information. The communication circuit 1510 may perform wireless or wired communications. The communication circuit 1510 may include the functionality of, or may be capable of performing communications with, a communication module. The communication circuit 1510 may include an RF transceiver or other circuit capable of performing wireless communications via an antenna. Communication circuit 1510 may be in communication with control circuit 1502 for transmitting and/or receiving information.

The control circuit 1502 may be in communication with a display 1508 (e.g., a visual display, such as an LED display) for providing information to a user. The display 1508 and the control circuit 1502 may be in two-way communication, as the display 1508 may include a touch screen module capable of receiving information from a user and providing such information to the control circuit 1502. The user device 1500 may include another input source 1504, such as a keyboard or other buttons, from which user inputs may be received at the control circuit 1502.

Each of the modules within the user device 1500 may be powered by a power source 1512. The power source 1512 may include an AC power supply or DC power supply, for example. The power source 1512 may generate a supply voltage $V_{CC}$ for powering the modules within the user device 1500.

Figure 16:
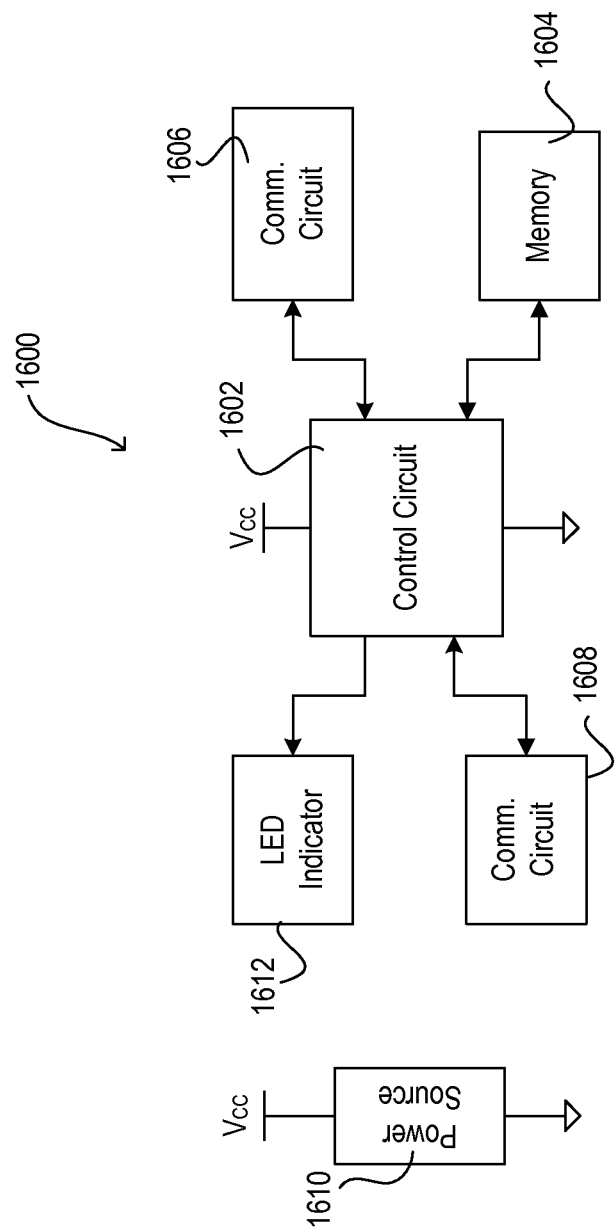
FIG. 16 is a block diagram illustrating an example communication module.

FIG. 16 is a block diagram illustrating an example communication module 1600, which may be deployed as, for example, the communication module 346 of the load control system of FIG. 3A. The communication module 1600 may include a control circuit 1602 for controlling the functionality of the communication module 1600. The control circuit 1602 may include one or more general purpose processors, special purpose processors, conventional processors, digital signal processors (DSPs), microprocessors, integrated circuits, a programmable logic device (PLD), application specific integrated circuits (ASICs), or the like. The control circuit 1602 may perform signal coding, data processing, power control, input/output processing, or any other functionality that enables the communication module 1600 to perform as described herein.

The control circuit 1602 may store information in and/or retrieve information from a memory 1604. The memory 1604 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The communication module 1600 may include a communication circuit 1606 for transmitting and/or receiving information. The communication circuit 1606 may perform wireless or wired communications. The communication module 1600 may also, or alternatively, include a communication circuit 1608 for transmitting and/or receiving information. The communication circuit 1608 may perform wireless or wired communications. Communication circuits 1606 and 1608 may be in communication with control circuit 1602. The communication circuits 1606 and 1608 may include an RF transceiver or other communication module capable of transmitting and/or receiving wireless communications via an antenna. The communication circuit 1606 and communication circuit 1608 may be capable of performing communications via different communication channels. For example, the communication circuit 1606 may be capable of communicating with a user device via a wireless communication channel (e.g., a BLUETOOTH® or near field communication channel) and the communication circuit 1608 may be capable of communicating with load control devices or other devices in a load control system via another wireless communication channel (e.g., WI-FI® or a proprietary communication channel, such as a communication channel using the CLEAR CONNECT™ protocol).

The control circuit 1602 may be in communication with an LED indicator 1612 for providing indications to a user. Each of the modules within the communication module 1600 may be powered by a power source 1610. The power source 1610 may include an AC power supply or DC power supply, for example. The power source 1610 may generate a supply voltage $V_{CC}$ for powering the modules within the communication module 1600.

Figure 17:
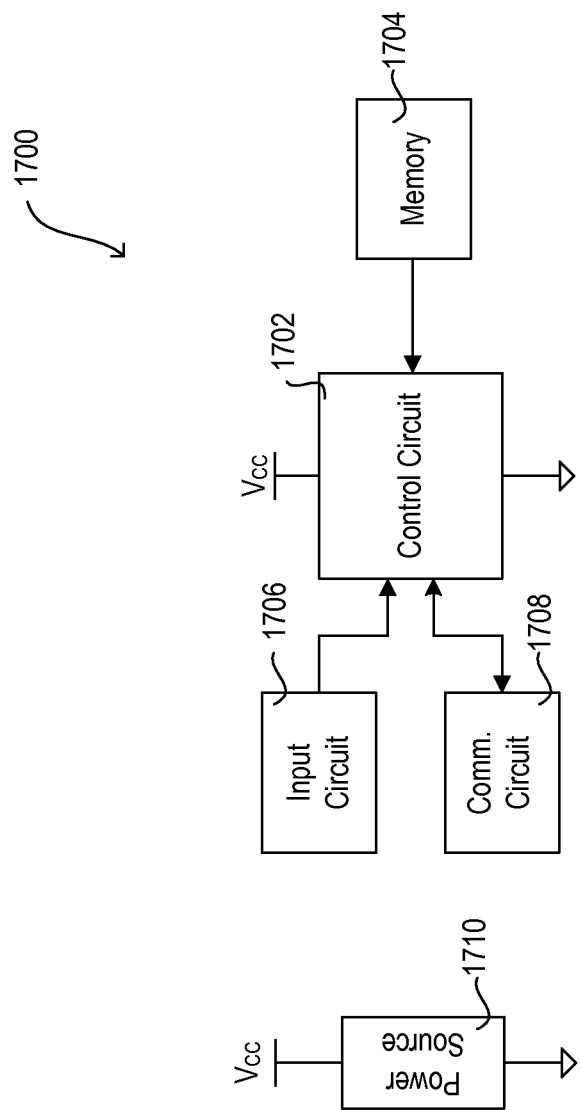
FIG. 17 is a block diagram illustrating an example control device.

FIG. 17 is a block diagram illustrating an example control device 1700. For example, the control device 1700 may be a control-source device. The control device 1700 may be a remote control device, an occupancy sensor, a daylight sensor, a temperature sensor, and/or the like. The control device 1700 may include a control circuit 1702 for controlling the functionality of the control device 1700. The control circuit 1702 may store information in and/or retrieve information from a memory 1704. The memory 1704 may include a non-removable memory and/or a removable memory.

The control device 1700 may include a communication circuit 1708 for transmitting and/or receiving information. The communication circuit 1708 may transmit and/or receive information via wired or wireless communications. The communication circuit 1708 may include a transmitter, an RF transceiver, or other circuit capable of performing wired and/or wireless communications. The communication circuit 1708 may be in communication with control circuit 1702 for transmitting and/or receiving information.

The control circuit 1702 may also be in communication with an input circuit 1706. The input circuit 1706 may include a button or a sensor circuit (e.g., an occupancy sensor circuit, a daylight sensor circuit, or a temperature sensor circuit) for receiving inputs that may be sent to a device for controlling an electrical load. The control circuit 1702 may receive information from the input circuit 1706 (e.g., an indication that a button has been actuated or sensed information). The control circuit 1702 may retrieve load control instructions from the memory 1704 based on the information received from the input circuit 1706. The control circuit 1702 may send the information received from the input circuit 1706 to another device via the communication circuit 1708. Each of the modules within the control device 1700 may be powered by a power source 1710.

Figure 18:
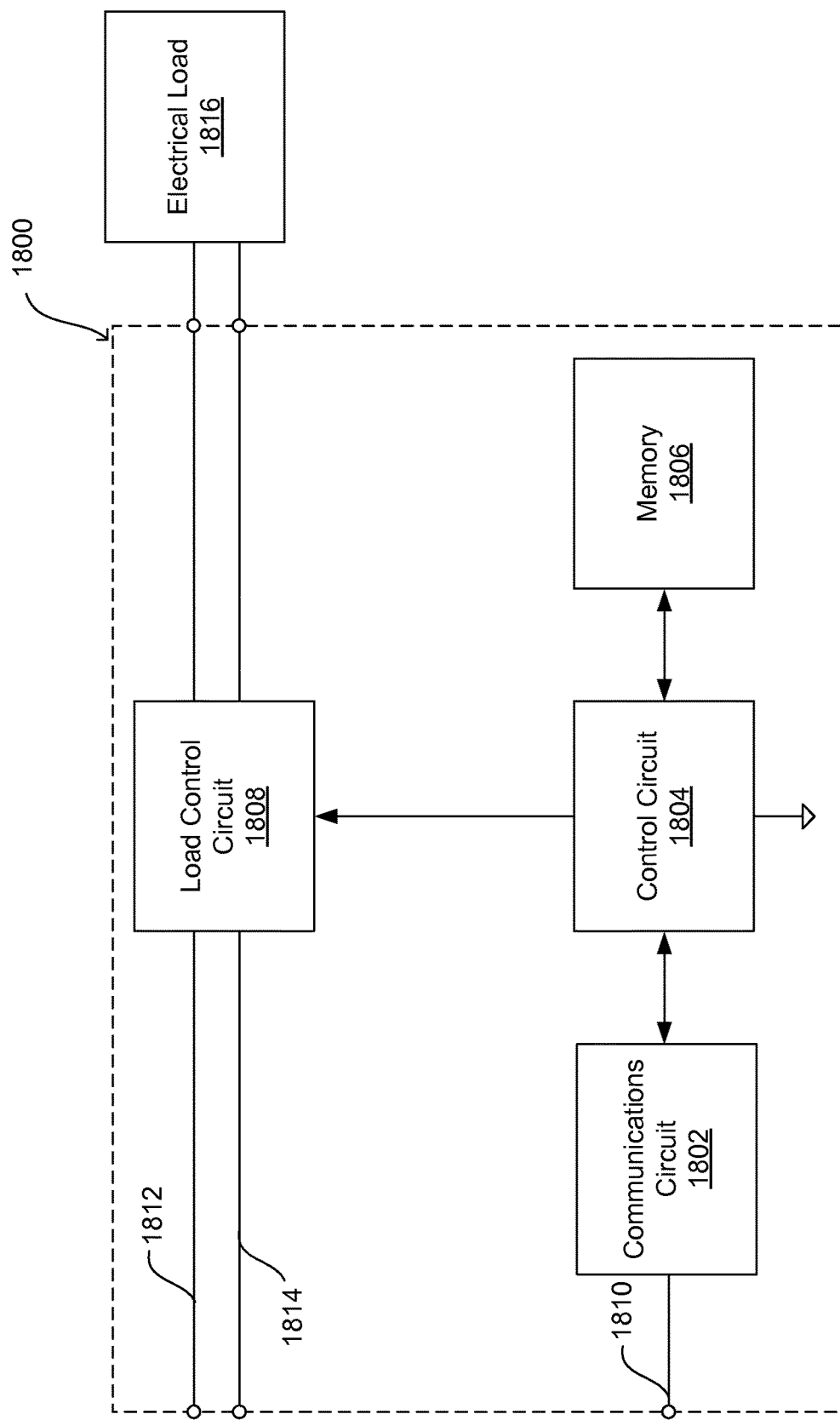
FIG. 18 is a block diagram illustrating an example load control device.

FIG. 18 is a block diagram illustrating an example load control device 1800. The load control device 1800 may be a control-target device for example. The load control device 1800 may be a dimmer switch, an electronic switch, an electronic ballast for lamps, an LED driver for LED light sources, a plug-in load control device, a temperature control device (e.g., a thermostat), a motor drive unit for a motorized window treatment, or other load control device. The load control device 1800 may include a communication circuit 1802. The communication circuit 1802 may include a receiver, an RF transceiver or other communication module capable of performing wired and/or wireless communications via communications link 1810.

The communication circuit 1802 may be in communication with a control circuit 1804. The control circuit 1804 may include one or more general purpose processors, special purpose processors, conventional processors, digital signal processors (DSPs), microprocessors, integrated circuits, a programmable logic device (PLD), application specific integrated circuits (ASICs), or the like. The control circuit 1804 may perform signal coding, data processing, power control, input/output processing, or any other functionality that enables the load control device 1800 to perform as described herein.

The control circuit 1804 may store information in and/or retrieve information from a memory 1806. For example, the memory 1806 may maintain a registry of associated load control devices and/or digital message information. The memory 1806 may include a non-removable memory and/or a removable memory. The load control circuit 1808 may receive instructions from the control circuit 1804 and may control the electrical load 1816 based on the received instructions. The load control circuit 1808 may receive power via the hot connection 1812 and the neutral connection 1814 and may provide an amount of power to the electrical load 1816. The electrical load 1816 may include any type of electrical load.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

The invention claimed is:

1. An electric load control device, comprising:
    communication interface circuitry;
    control circuitry to:
        responsive to receipt, via communication interface circuitry, of a broadcast discovery message transmitted by a user device via a first communication network:
            determine an RSSI for the received broadcast discovery signal;
            obtain from the broadcast discovery message a minimum response signal strength;
            determine whether the RSSI of the received broadcast discovery signal is greater than the minimum response signal strength; and
            responsive to the determination that the RSSI exceeds the minimum response signal strength:
                generate a discovery response signal, wherein the discovery response signal includes data representative of:
                    an identifier assigned to the electric load control device;
                    the RSSI of the received broadcast discovery message; and
                    data representative of an identity of each of one or more second electric load control devices included in a network of electric load control devices and from which the electric load control device has received a message.

2. The electric load control device of claim 1 wherein the discovery response signal further comprises:
    data representative of an event occurrence between the electric load control device and each of the one or more second electric load control devices from which the electric load control device has received the message.

3. The electric load control device of claim 1 wherein the discovery response signal further comprises:
    data representative of a serial message identifier from each of the one or more second electric load control devices from which the electric load control device has received the message.

4. The electric load control device of claim 1 wherein to generate the discovery response signal that includes data representative of the identifier assigned to the electric load control device, the control circuitry to further:
    generate a discovery response signal that includes data representative of the unique identifier assigned to the electric load control device.

5. The electric load control device of claim 1 wherein the discovery response signal further comprises:
    data representative of a network identifier assigned to the electric load device.

6. The electric load control device of claim 1, further comprising:
    memory circuitry communicatively coupled to the control circuitry;
    wherein the control circuitry to further:
        receive, via the communication interface circuitry, an association message that includes data indicative of an association between the electric load control device and a third electric load control device included in the network of electric load control devices; and
        cause a storage of the received data indicative of the association between the electric load control device and the third electric load control device in the memory circuitry.

7. The electric load control device of claim 6 wherein to receive the association message that includes data indicative of the association between the electric load control device and the third electric load control device, further comprises:
    receive, via the communication interface circuitry, the association message that includes the data indicative of the association between the electric load control device and a third electric load control device via a second communication network different than the first communication network.

8. The electric load control device of claim 7 wherein responsive to the receipt of the association message that includes the data indicative of the association between the electric load control device and a third electric load control device via the second communication network the control circuitry to further:
    cause the storage of the received data indicative of the association between the electric load control device and the third electric load control device, responsive to receipt of the association message from a system controller included in the network of electrical load control devices.

9. The electric load control device of claim 6 wherein to receive the association message that includes data indicative of the association between the electric load control device and the third electric load control device, further comprises:
    receive, via the communication interface circuitry, the association message that includes the data indicative of the association between the electric load control device and a third electric load control device via the first communication network.

10. The electric load control device of claim 9 wherein to cause the storage of the received data indicative of the association between the electric load control device and the third electric load control device responsive to receipt of the association message, further comprises:
    cause the storage of the received data indicative of the association between the electric load control device and the third electric load control device, responsive to receipt of the association message from the user device.

11. An electric load control device discovery method, comprising:
    receiving, by electric load controller control circuitry via communication interface circuitry, a broadcast discovery message transmitted by a user device using a first communication network; and
    responsive to receipt of the broadcast discovery message transmitted by the user device via the first communication network:
        determining, by the electric load controller control circuitry, an RSSI for the received broadcast discovery signal;
        obtaining, by the electric load controller control circuitry, from the broadcast discovery message a minimum response signal strength;
        determining, by the electric load controller control circuitry, whether the RSSI of the received broadcast discovery signal is greater than the minimum response signal strength; and responsive to the determination that the RSSI exceeds the minimum response signal strength:

generating, by the electric load controller control circuitry, a discovery response signal, wherein the discovery response signal includes data representative of:

an identifier assigned to the electric load control device;

the RSSI of the received broadcast discovery message; and data representative of an identity of each of one or more second electric load control devices included in a network of electric load control devices and from which the electric load control device has received a message.

12. The electric load control method of claim 11 wherein generating the discovery response signal further comprises:

generating, by the electric load controller control circuitry, the discovery response signal, wherein the discovery response signal further includes:

data representative of an event occurrence between the electric load control device and each of the one or more second electric load control devices from which the electric load control device has received the message.

13. The electric load control method of claim 11 wherein generating the discovery response signal further comprises:

generating, by the electric load controller control circuitry, the discovery response signal, wherein the discovery response signal further includes:

data representative of a serial message identifier from each of the one or more second electric load control devices from which the electric load control device has received the message.

14. The electric load control method of claim 11 wherein generating the discovery response signal that includes data representative of the identifier assigned to the electric load control device, further comprises:

generating, by the electric load controller control circuitry, a discovery response signal that includes data representative of the unique identifier assigned to the electric load control device.

15. The electric load control method of claim 11 wherein generating the discovery response signal that includes data representative of the identifier assigned to the electric load control device, further comprises:

generating, by the electric load controller control circuitry, a discovery response signal that includes data representative of a network identifier assigned to the electric load device.

16. The electric load control method of claim 11, further comprising:

receiving, by the electric load controller control circuitry via the communication interface circuitry, an association message that includes data indicative of an association between the electric load control device and a third electric load control device included in the network of electric load control devices; and causing, by the electric load controller control circuitry, a storage of the received data indicative of the association between the electric load control device and the third electric load control device in memory circuitry communicatively coupled to the control circuitry.

17. The electric load control method of claim 16 wherein receiving the association message that includes data indicative of the association between the electric load control device and the third electric load control device, further comprises:

receiving, by the electric load controller control circuitry via the communication interface circuitry, the association message that includes the data indicative of the association between the electric load control device and the third electric load control device via a second communication network different than the first communication network.

18. The electric load control method of claim 17, wherein causing the storage of the received data indicative of the association between the electric load control device and the third electric load control device in the communicatively coupled memory circuitry further comprises:

causing, by the electric load control circuitry, the storage of the received data indicative of the association between the electric load control device and the third electric load control device, responsive to receipt of the association message from a system controller included in the network of electrical load control devices.

19. The electric load control method of claim 16 wherein receiving the association message that includes data indicative of the association between the electric load control device and the third electric load control device, further comprises:

receiving, by the electric load controller control circuitry via the communication interface circuitry, the association message that includes the data indicative of the association between the electric load control device and the third electric load control device via the first communication network.

20. The electric load control method of claim 19 wherein causing the storage of the received data indicative of the association between the electric load control device and the third electric load control device responsive to receipt of the association message, further comprises:

causing, by the electric load control circuitry, the storage of the received data indicative of the association between the electric load control device and the third electric load control device, responsive to receipt of the association message from the user device.

21. A non-transitory, machine-readable, storage device that includes instructions that, when executed by electric load controller control circuitry, causes the electrical load controller control circuitry to:

receive, via communication interface circuitry, a broadcast discovery message transmitted by a user device using a first communication network; and responsive to receipt of the broadcast discovery message transmitted by the user device via the first communication network:

determine an RSSI for the received broadcast discovery signal;

obtain from the broadcast discovery message a minimum response signal strength;

determine whether the RSSI of the received broadcast discovery signal is greater than the minimum response signal strength; and responsive to the determination by the electrical load controller control circuitry that the RSSI exceeds the minimum response signal strength:

generate a discovery response signal, wherein the discovery response signal includes data representative of:

an identifier assigned to the electric load control device;

the RSSI of the received broadcast discovery message; and data representative of an identity of each of one or more second electric load control devices included in a network of electric load control devices and from which the electric load control device has received a message.

22. The non-transitory, machine-readable, storage device of claim 21 wherein the instructions that cause the electrical load controller control circuitry to generate the discovery response signal further cause the electrical load controller control circuitry to:

generate the discovery response signal, wherein the discovery response signal further includes:

data representative of an event occurrence between the electric load control device and each of the one or more second electric load control devices from which the electric load control device has received the message.

23. The non-transitory, machine-readable, storage device of claim 21 wherein the instructions that cause the electrical load controller control circuitry to generate the discovery response signal further cause the electrical load controller control circuitry to:

generate the discovery response signal, wherein the discovery response signal further includes:

data representative of a serial message identifier from each of the one or more second electric load control devices from which the electric load control device has received the message.

24. The non-transitory, machine-readable, storage device of claim 21 wherein the instructions that cause the electrical load controller control circuitry to generate generating the discovery response signal that includes data representative of the identifier assigned to the electric load control device, further causes the electrical load controller control circuitry to:

generate the discovery response signal, wherein the discovery response signal further includes:

data representative of the unique identifier assigned to the electric load control device.

25. The non-transitory, machine-readable, storage device of claim 21 wherein the instructions that cause the electrical load controller control circuitry to generate the discovery response signal that includes data representative of the identifier assigned to the electric load control device, further causes the electrical load controller control circuitry to:

generate the discovery response signal, wherein the discovery response signal further includes:

data representative of a network identifier assigned to the electric load device.

26. The non-transitory, machine-readable, storage device of claim 21 wherein the instructions further cause the electrical load controller control circuitry to:

receive, via the communication interface circuitry, an association message that includes data indicative of an association between the electric load control device and a third electric load control device included in the network of electric load control devices; and cause a storage of the received data indicative of the association between the electric load control device and the third electric load control device in memory circuitry communicatively coupled to the control circuitry.

27. The non-transitory, machine-readable, storage device of claim 26 wherein the instructions that cause the electrical load controller control circuitry to receive the association message that includes data indicative of the association between the electric load control device and the third electric load control device, further causes the electrical load controller control circuitry to:

receive, via the communication interface circuitry, the association message that includes the data indicative of the association between the electric load control device and the third electric load control device via a second communication network different than the first communication network.

28. The non-transitory, machine-readable, storage device of claim 27 wherein the instructions that cause the electrical load controller control circuitry to cause the storage of the received data indicative of the association between the electric load control device and the third electric load control device in the communicatively coupled memory circuitry further causes the electrical load controller control circuitry to:

cause the storage of the received data indicative of the association between the electric load control device and the third electric load control device, responsive to receipt of the association message from a system controller included in the network of electrical load control devices.

29. The non-transitory, machine-readable, storage device of claim 26 wherein the instructions that cause the electrical load controller control circuitry to receive the association message that includes data indicative of the association between the electric load control device and the third electric load control device, further causes the electrical load controller control circuitry to:

receive via the communication interface circuitry, the association message that includes the data indicative of the association between the electric load control device and the third electric load control device via the first communication network.

30. The non-transitory, machine-readable, storage device of claim 29 wherein the instructions that cause the electrical load controller control circuitry to cause the storage of the received data indicative of the association between the electric load control device and the third electric load control device responsive to receipt of the association message, further causes the electrical load controller control circuitry to:

cause the storage of the received data indicative of the association between the electric load control device and the third electric load control device, responsive to receipt of the association message from the user device.

* * * * *